E. H. PIERSEN.
TELEGRAPH TRANSMITTER.
APPLICATION FILED DEC. 17, 1912.
1,157,040.
Patented Oct. 19, 1915.
14 SHEETS—SHEET 8.
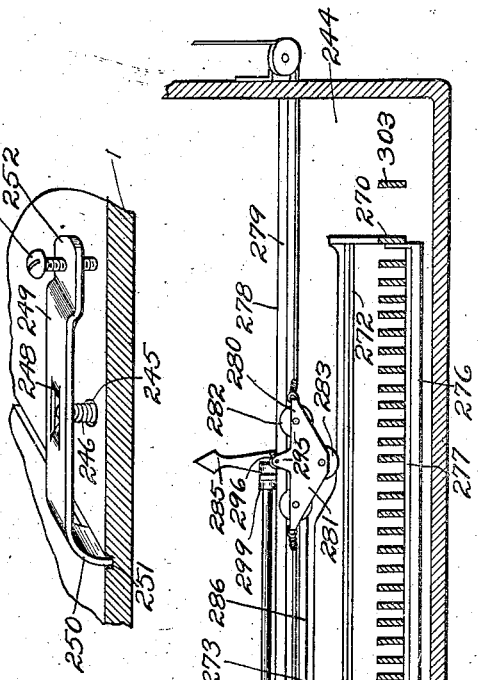
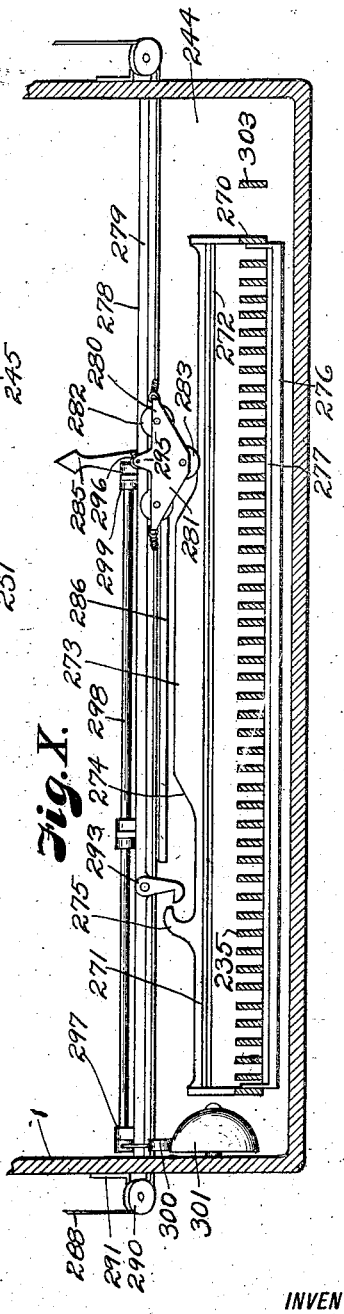
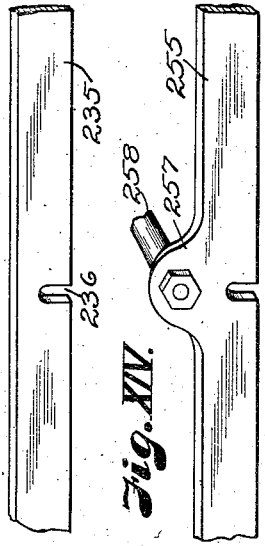
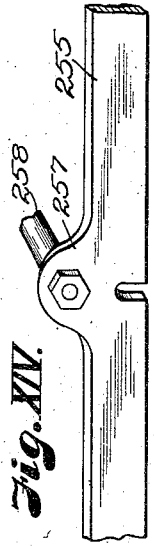
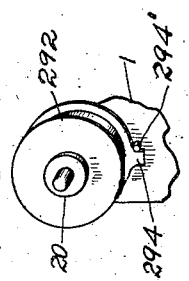
WITNESSES:
Arthur U. Caps.
Lewis L. Miller.
INVENTOR
Edwin H. Piersen
BY
Arthur C. Crown.
ATTORNEY

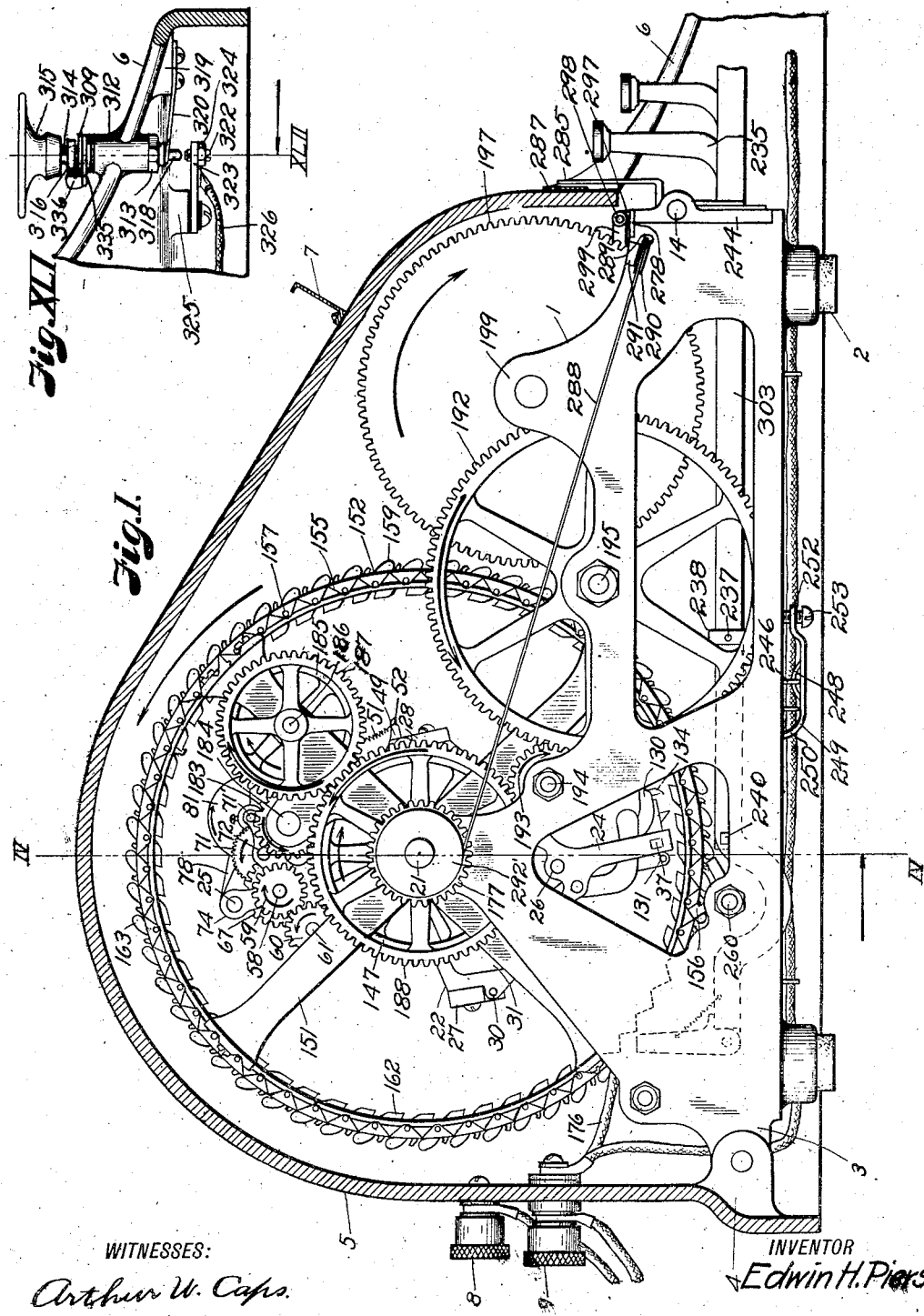
E. H. PIERSEN.
TELEGRAPH TRANSMITTER.
APPLICATION FILED DEC. 17, 1912.
1,157,040.
Patented Oct. 19, 1915.
14 SHEETS—SHEET 1.
WITNESSES:
Arthur W. Caps.
Lewis L. Miller.
INVENTOR
Edwin H. Piersen
By Arthur C. Brown
ATTORNEY

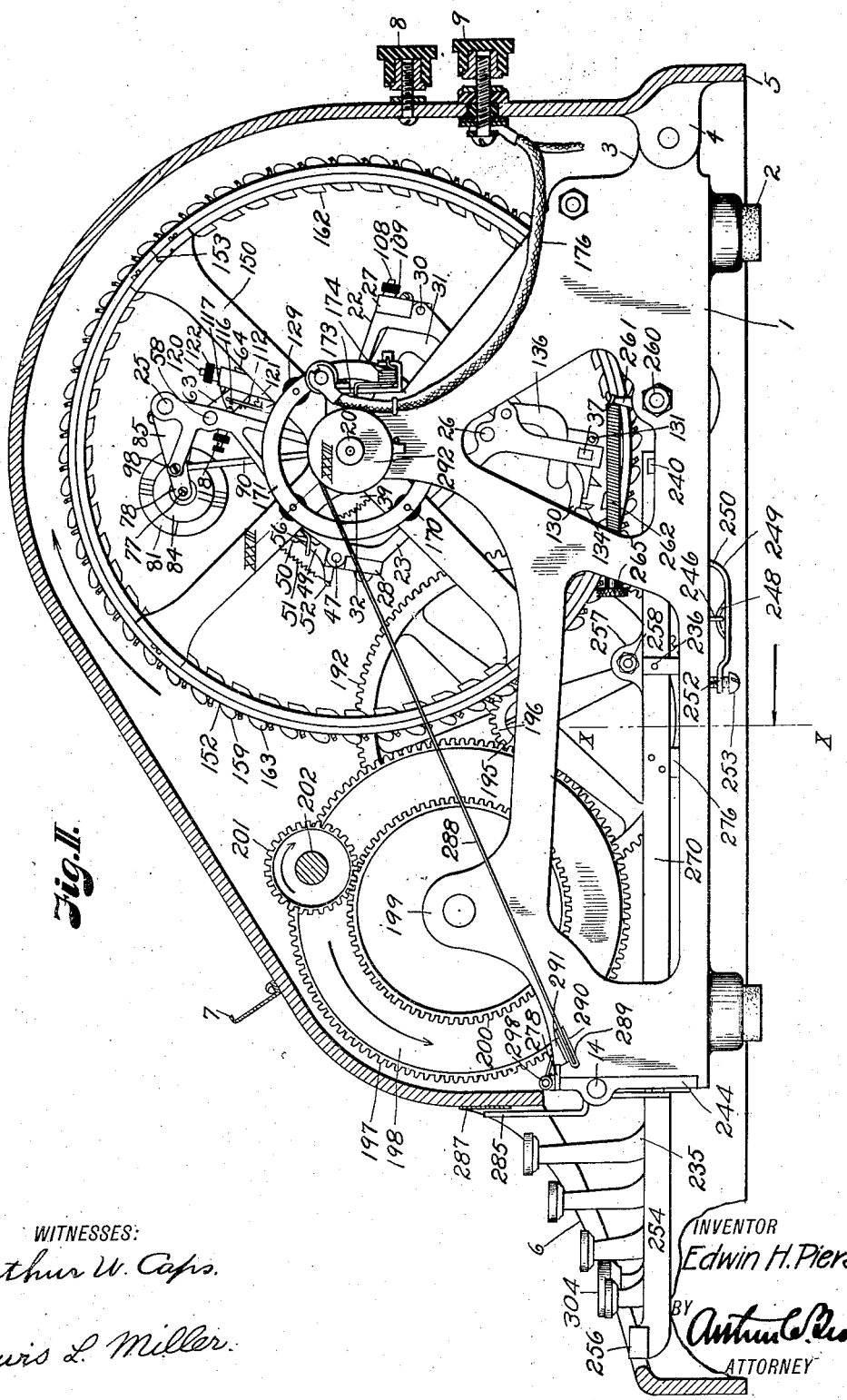

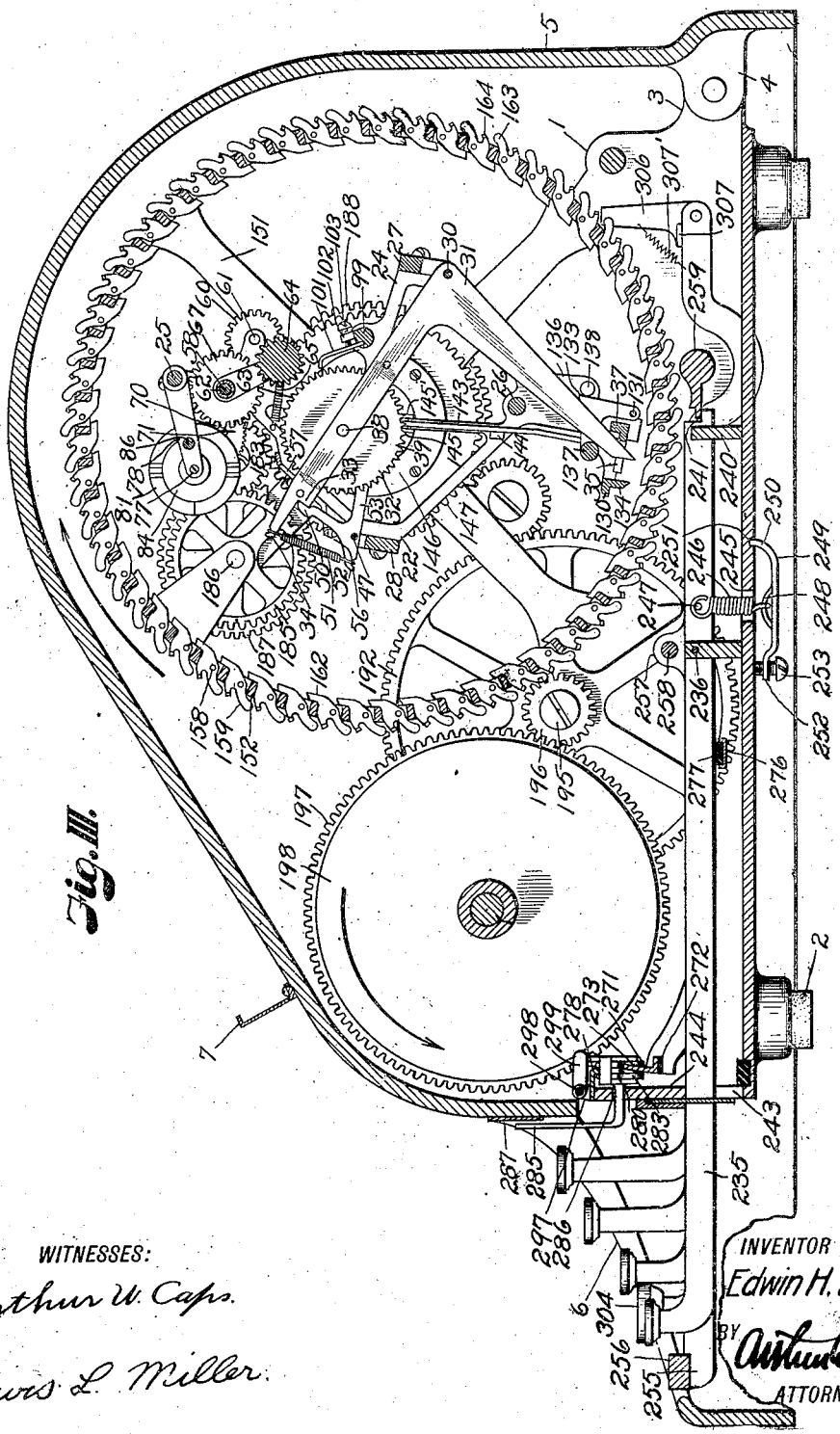

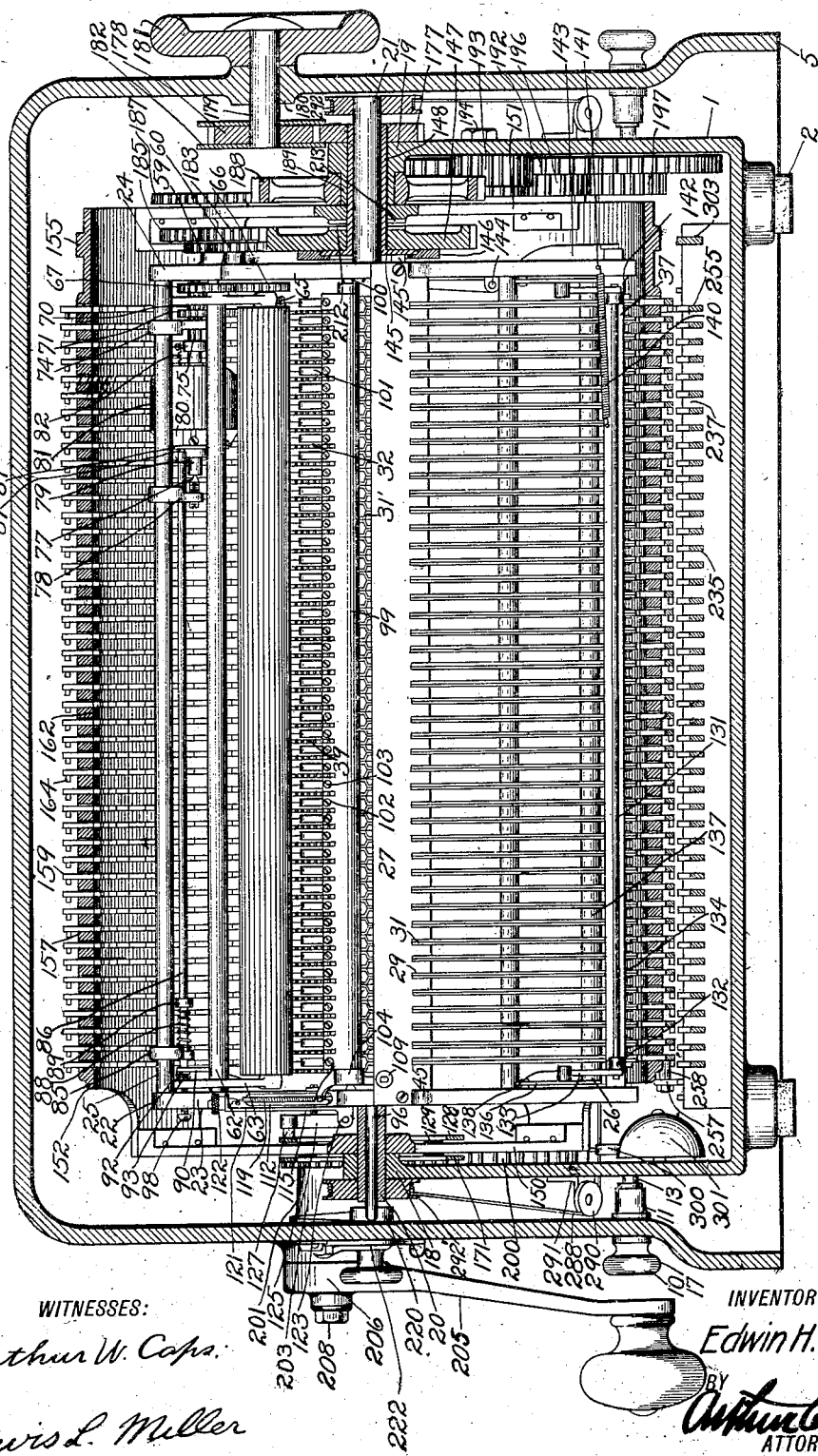

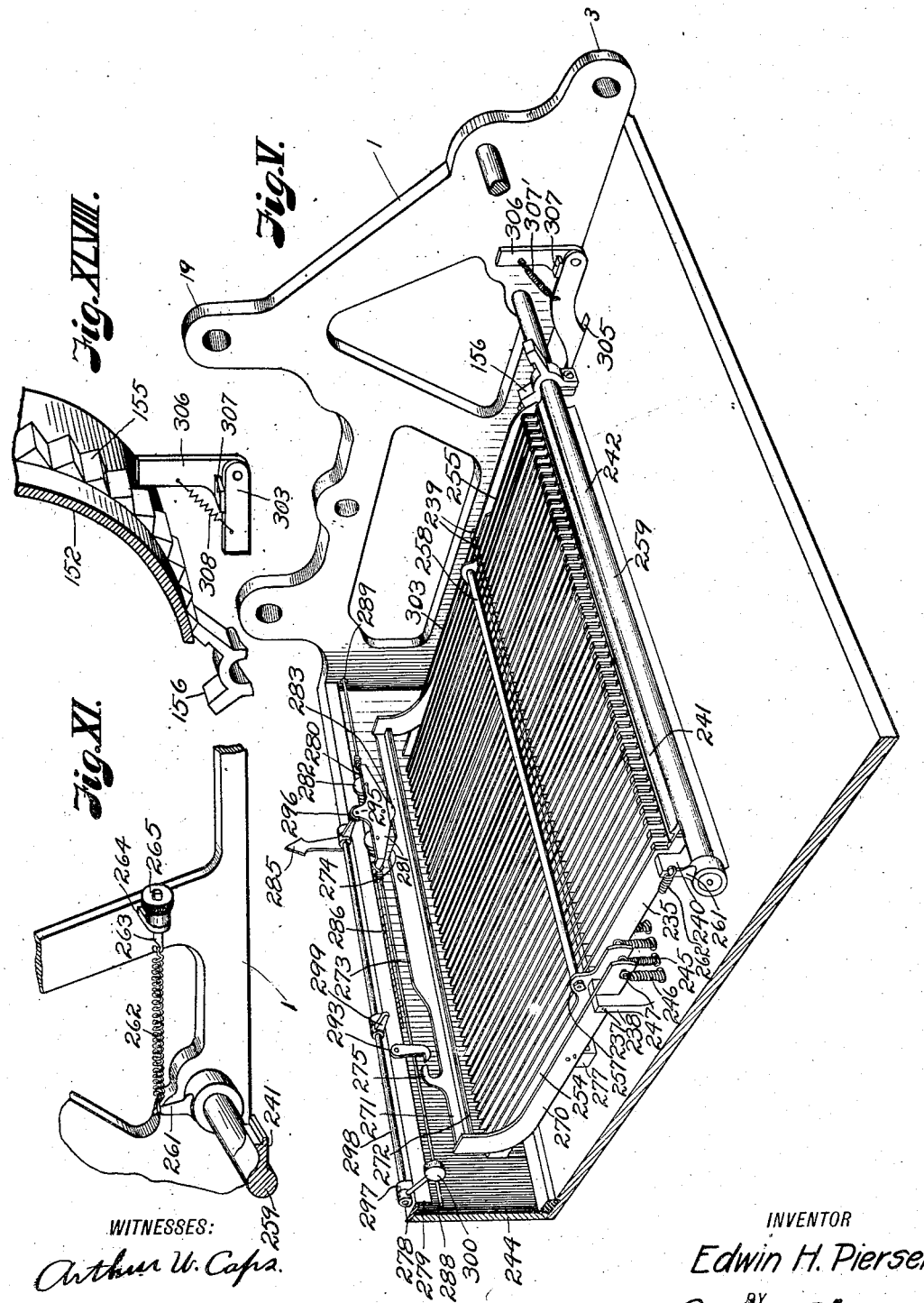

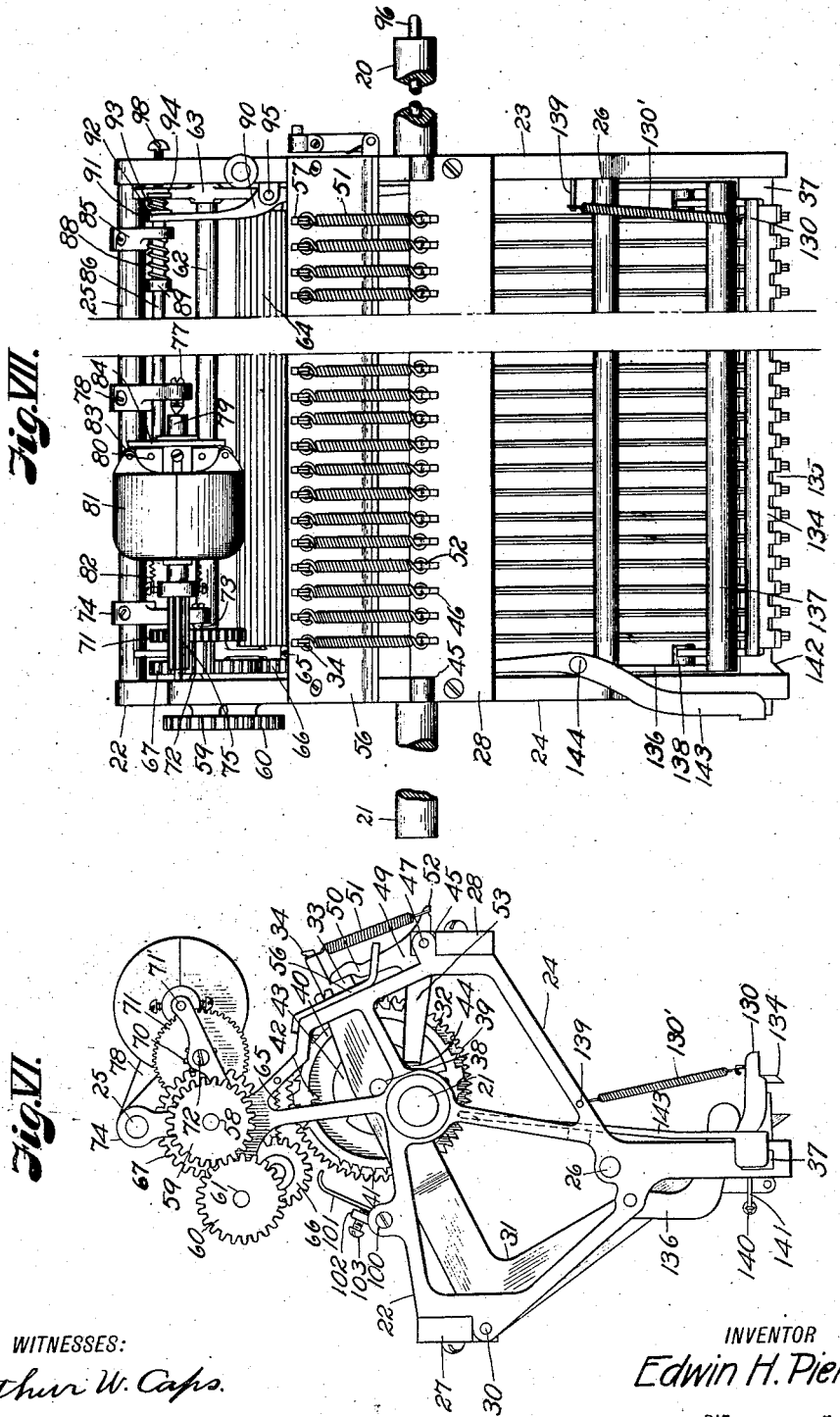

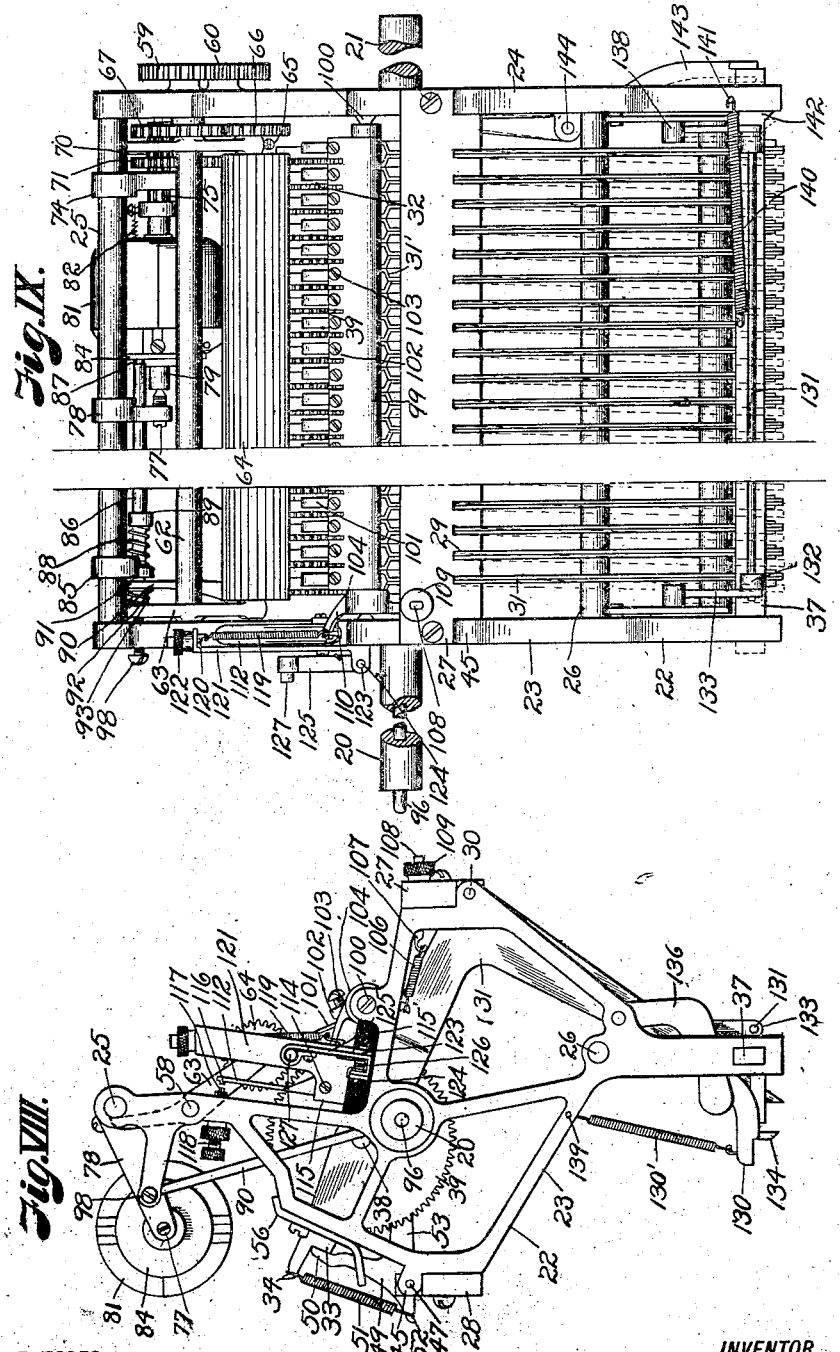

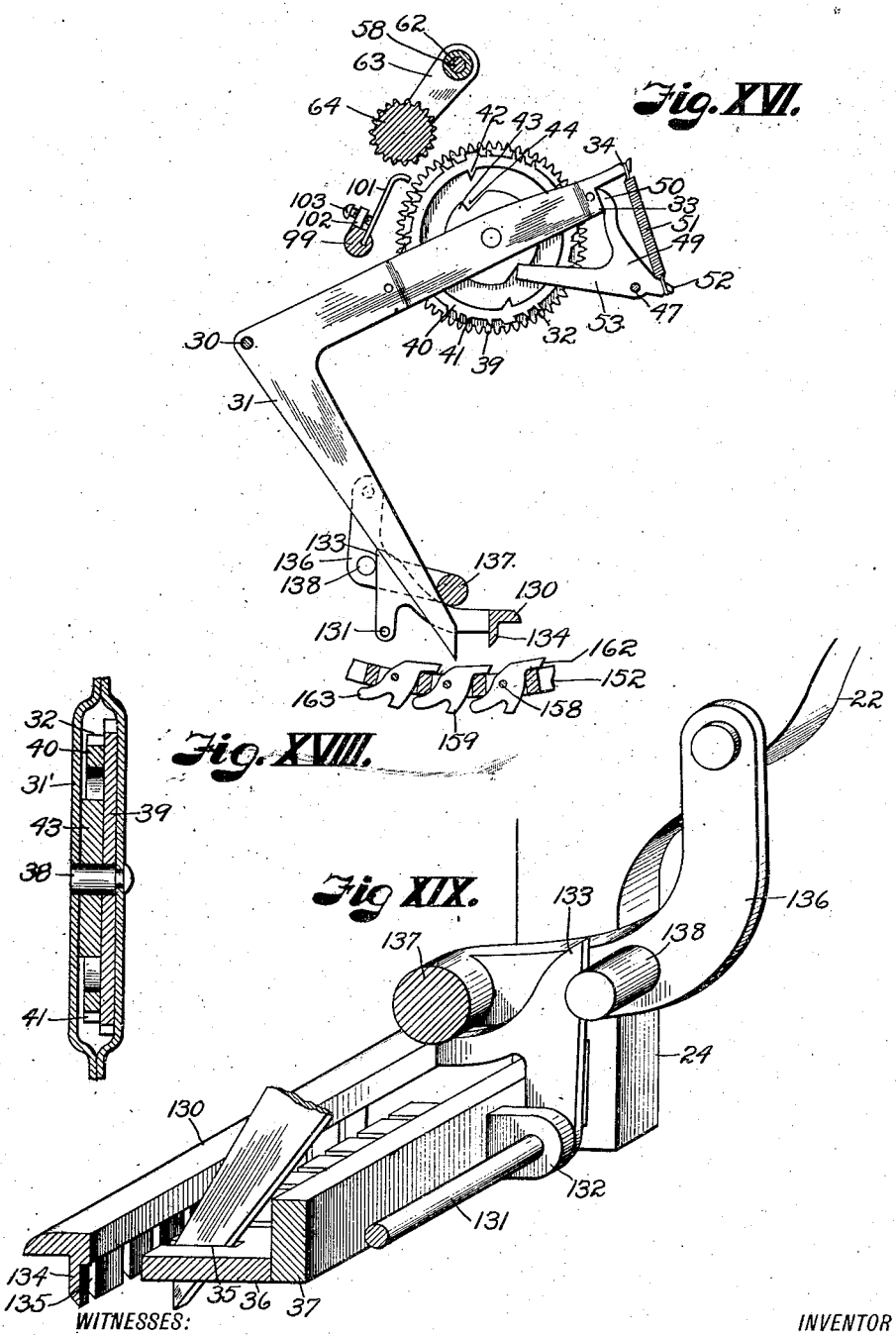

E. H. PIERSEN.
TELEGRAPH TRANSMITTER.
APPLICATION FILED DEC. 17, 1912.
1,157,040.
Patented Oct. 19, 1915.
14 SHEETS—SHEET 10.
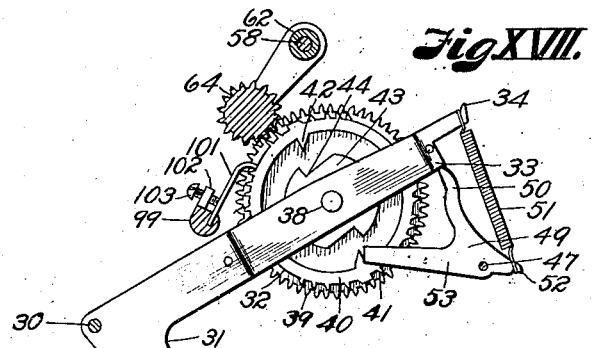
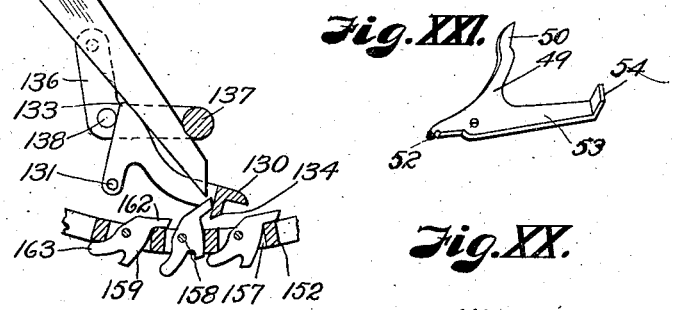
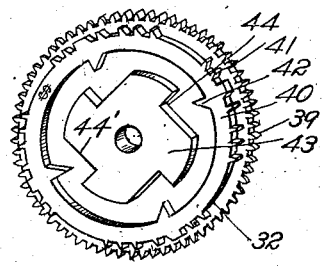
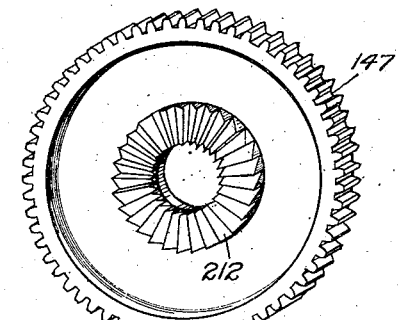
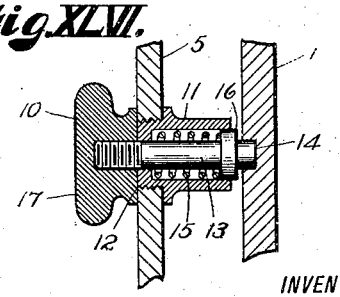
WITNESSES:
Arthur W. Capa.
Lewis L. Miller.
INVENTOR
Edwin H. Piersen.
BY
Arthur C. Brown
ATTORNEY

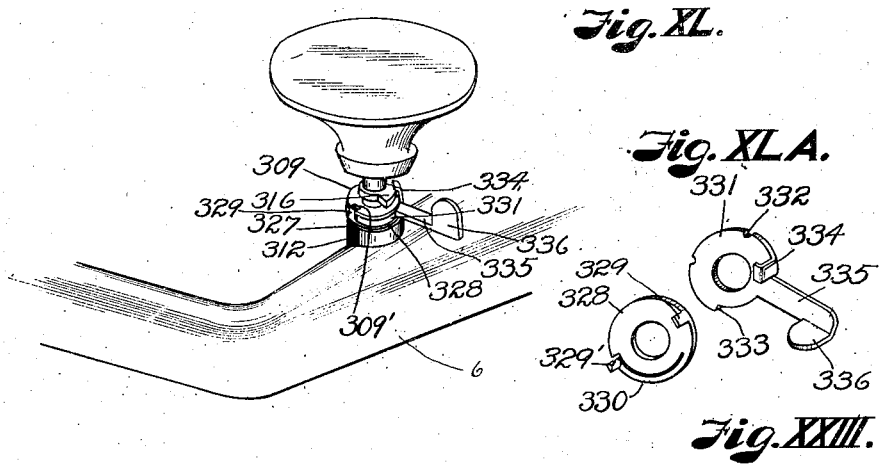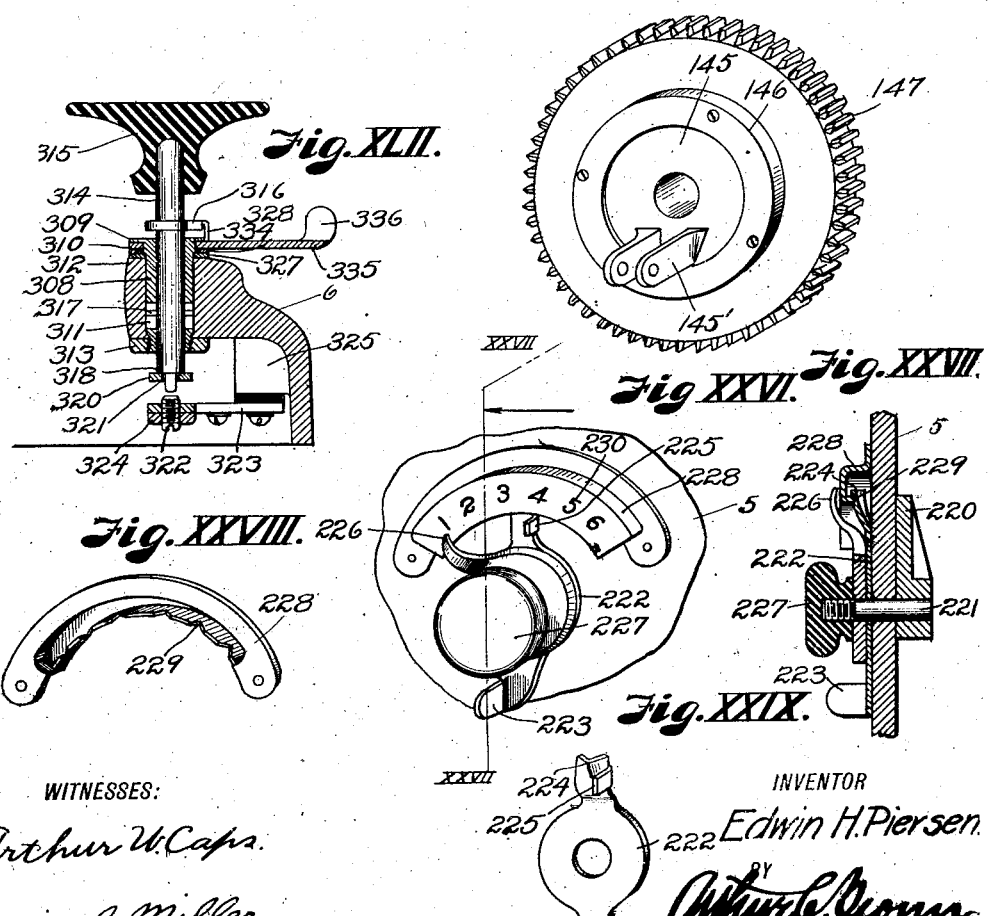

E. H. PIERSEN.
TELEGRAPH TRANSMITTER.
APPLICATION FILED DEC. 17, 1912.
1,157,040.
Patented Oct. 19, 1915.
14 SHEETS—SHEET 12.
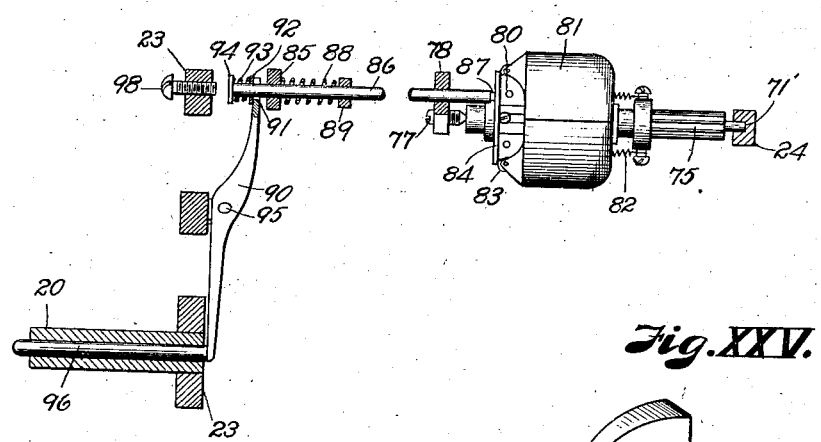
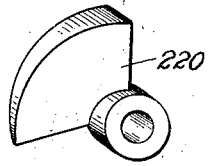
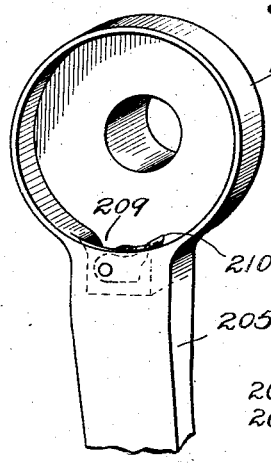
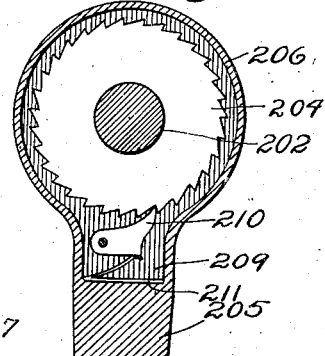
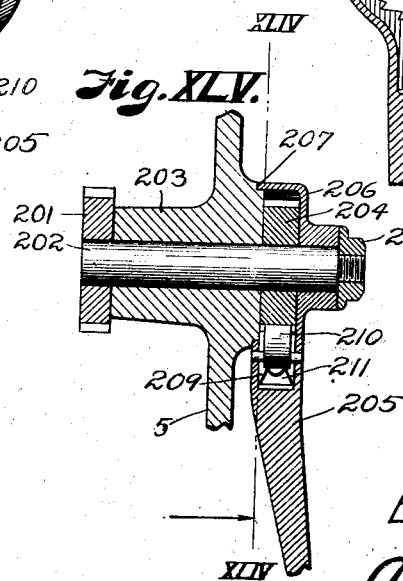
WITNESSES:
Arthur W. Caps.
Lewis L. Miller.
INVENTOR
Edwin H. Piersen.
BY
Arthur C. Brown
ATTORNEY

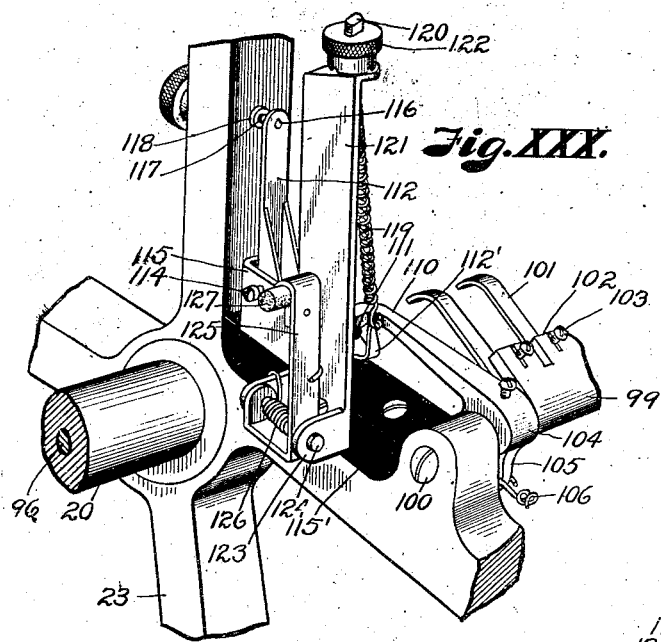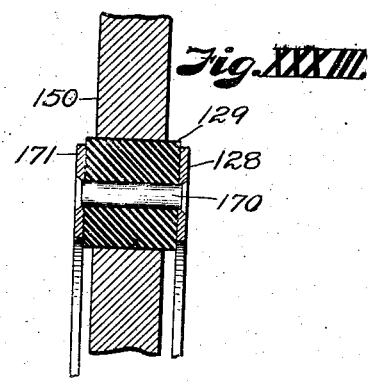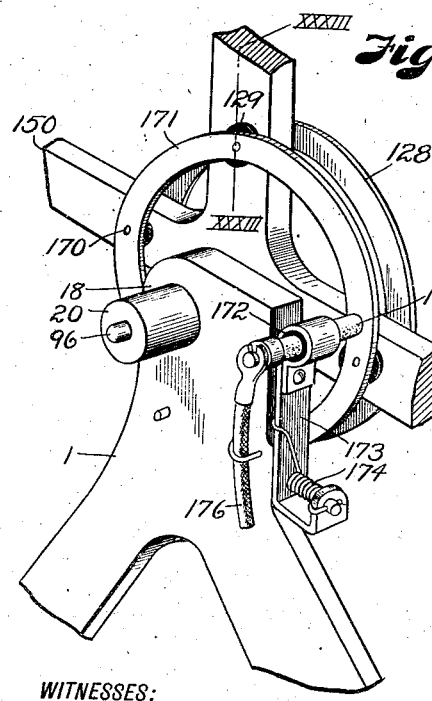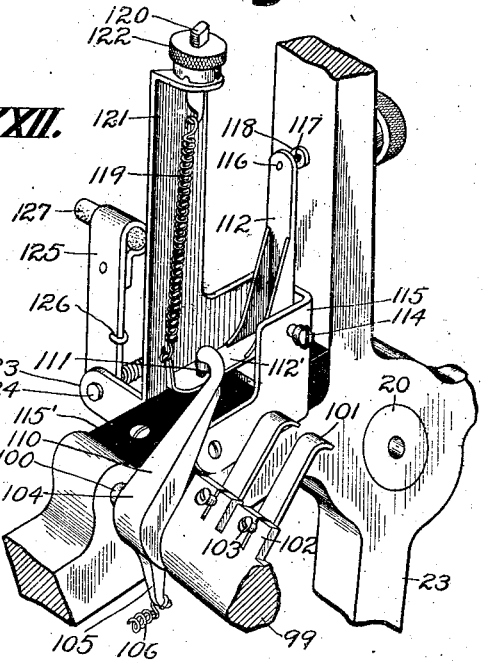

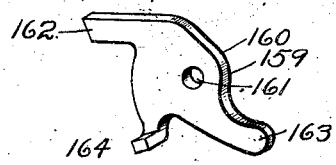
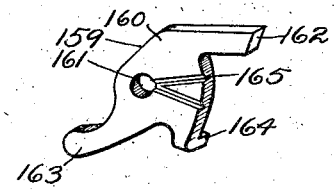
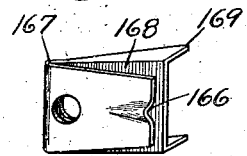
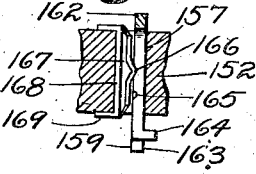
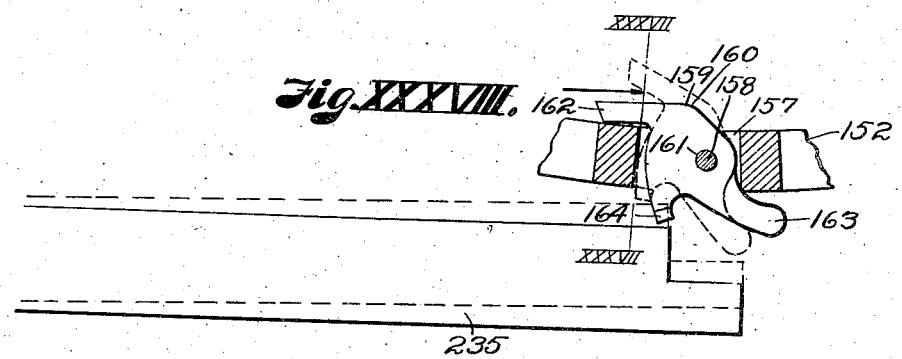
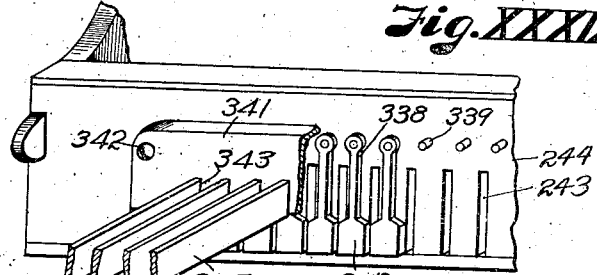

UNITED STATES PATENT OFFICE.

EDWIN H. PIERSEN, OF TOPEKA, KANSAS, ASSIGNOR TO THE PIERSEN TELEGRAPH TRANSMITTER COMPANY, OF TOPEKA, KANSAS, A CORPORATION OF KANSAS.

TELEGRAPH-TRANSMITTER.

1,157,040.　　Specification of Letters Patent.　　Patented Oct. 19, 1915.

Application filed December 17, 1912.　Serial No. 737,239.

*To all whom it may concern:*

Be it known that I, EDWIN H. PIERSEN, a citizen of the United States, residing at Topeka, in the county of Shawnee and State of Kansas, have invented certain new and useful Improvements in Telegraph-Transmitters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to telegraph transmitters, and more particularly to one of that class utilizing a keyboard for releasing character forming members to the action of a motor and into operative relation with a circuit making and breaking mechanism, whereby impulses corresponding with those produced by an ordinary telegraph key are created.

It is the principal object of the present invention to produce a machine of this type wherein the characters to be sent may accumulate and connect with the motor and circuit breaker in proper sequence, irrespective of the speed or regularity of operation of the keyboard, thereby obviating confusion of the symbols or the necessity for special training of an operator. In accomplishing this object, I provide an accumulating cylinder having a plurality of trip members for each character sendable by the machine, and a single character member for each set of trips. All of the character members are mounted in a frame, which is independent of, but adapted for actuation from the drum driving mechanism, the connections being such that radial tension from said driving mechanism will tend to move the drum and frame in opposite directions, with the result that while the character frame is always advanced with the accumulating cylinder it always returns to its initial position, and during its return travel wipes the active trips in the drum to release the proper character members.

It is also an object of the invention to provide improved details of structure for accomplishing the general object above mentioned, the preferred forms of which are illustrated in the accompanying drawings, wherein:—

Figure I is a side elevation of a transmitter constructed according to my invention, the case being in section. Fig. II is an elevation of the opposite side of the same. Fig. III is a longitudinal section of the same. Fig. IV is a transverse section of the same on the line IV—IV, Fig. 1. Fig. V is a rear perspective view of the frame and keyboard levers. Fig. VI is a side elevation of the character collecting and forming device. Fig. VII is a front view of same. Fig. VIII is an elevation of the opposite side of the device. Fig. IX is a rear view of the device. Fig. X is a section on the line X—X, Fig. II, showing the visible, audible and touch indicators and keyboard lock. Fig. XI is a perspective view of a device for uniformally varying the touch of the keyboard. Fig. XII is a perspective view of the keyboard indicator finger and carriage. Fig. XIII is a perspective view of a portion of one of the key levers, illustrating its method of mounting. Fig. XIV is a perspective view of one side of the spacer bar lever showing its mounting and torsion rod. Fig. XV is an inverted perspective view of the key lever spring adjusting device. Fig. XVI is a detail view of one of the character forming disks and mounting, a part of the auxiliary mechanism and a portion of the accumulating drum, the parts being shown in normal position. Fig. XVII is a similar view, the parts being shown in operative position. Fig. XVIII is a sectional view of one of the character disks and its mounting. Fig. XIX is an enlarged perspective view of a portion of the lower part of the character forming and collecting device, viewed from the inside. Fig. XX is a perspective view of one of the character disks. Fig. XXI is a similar view of the stop lever for controlling the disk. Fig. XXII is a perspective view of a gear for operating the character forming and collecting device. Fig. XXIII is a similar view of the opposite side of said gear. Fig. XXIV is a detail view of the governor and its setting mechanism. Fig. XXV is a detail view of a cam for actuating the governor setting mechanism. Fig. XXVI is a perspective view of the speed indicator. Fig. XXVII is a sectional view of the indicator on the line XXVII—XXVII, Fig. XXVI. Fig. XXVIII is a detail view of the indicator quadrant. Fig. XXIX is a detail view of the indicator spring. Fig. XXX is an outside perspective view of the contact breaker. Fig. XXXI is an inside perspective view of same. Fig. XXXII is a perspective view of the collector rings and the frame wiper, forming part of the contact breaker. Fig. XXXIII is a section on the line XXXIII—XXXIII, Fig. XXXII, showing the insulation for the collector rings. Fig. XXXIV is a detail perspective view of one of the dogs in the accumulating drum. Fig. XXXV is a similar view of the opposite side of same. Fig. XXXVI is a detail perspective view of the spring latch for the above named dog. Fig. XXXVII is a sectional view, on the line XXXVII—XXXVII, Fig. XXXVIII, showing the relation between the spring latch and dog. Fig. XXXVIII is a side elevation of one of the dogs and its key lever, illustrating the action of those parts. Fig. XXXIX is a perspective view of the latch board for insuring single actuation of the key levers. Fig. XL is a perspective view of a hand key used in connection with the machine. Fig. XLA is a detail perspective of the key lock. Fig. XLI is a side elevation of a front part of the machine case, showing the mounting of the hand key. Fig. XLII is a vertical section of the key and its mounting, on the line XLII—XLII, Fig. XLI. Fig. XLIII is a perspective view of the crank cup and pawl for winding the spring motor. Fig. XLIV is a vertical section on the line XLIV—XLIV, Fig. XLV. Fig. XLV is a sectional view through the casing, showing the ratchet crank and winding pinion. Fig. XLVI is a sectional view of a spring latch for securing the cover to the frame. Fig. XLVII is a perspective view of one of the indicator sheaves. Fig. XLVIII is a detail perspective of a portion of the drum ratchet and pawl.

Referring more in detail to the parts:—
1 designates a frame wherein the accumulating drum, character frame, keyboard, and other operative parts of the machine, are mounted, being preferably provided with rubber feet 2 for cushioning its support and deadening sound of the machine, and with rearwardly extending lugs 3 to which the ears 4 of a cover 5 are pivotally mounted. The cover 5 covers the frame 1 and the parts contained therein, and has forwardly extending side portions 6 adapted for inclosing the keyboard, the inclined top being preferably provided with a copy holder 7. The rear of the cover is provided with suitable apertures for receiving the binder posts 8—9, the former of which is grounded on the case and the latter insulated therefrom in order to complete a grounded circuit through the parts of the machine, as will presently be described.

In order to hold the cover in place, I provide same with latches 10 (Fig. XLVI) comprising a cup 11 which is threaded into the cover from inside and has an aperture 12 through which a plunger 13 is slidably projected, the inner end of the plunger being adapted to seat within a socket 14 in the stationary frame 1 and normally held in its holding position by a coil spring 15 which bears against the base of the cup 11 and against a shoulder 16 on the plunger, the outer end of the plunger being provided with a knob 17 by which it may be drawn outwardly against the tension of the spring to break the connection with the frame when the cover is to be tipped back.

Journaled in hubs 18 and 19 (Fig. IV), on frame 1, are tubular gudgeons 20 and 21, which project axially from the character member frame 22 (Figs. VI and IX) comprising skeleton end members 23 and 24 on which the gudgeons are fixed and tie rods 25 and 26 and bars 27 and 28 which unite the end members to form a rigid frame. The bar 27 is seated within offsets in the rear of the end members 23 and 24 and provided with slots 29.

Pivotally mounted on a shaft 30, which is fixed in the end members 23 and 24, and extending through the lower portion of the bar 27, are bell crank levers 31 corresponding in number with the character members comprised by the machine.

The upper arm of each bell crank lever extends upwardly and forwardly past the center of the accumulating drum within which the character frame is mounted and near its end is offset and provided with a lamina 37' (Fig. XVIII) which is spread from the body of the lever to form a pocket for containing the character member 32, presently described, and at its end is a downwardly facing shoulder 33 and upwardly facing hook 34. The lower arm of the lever is pointed and slidably mounted in slots 35 (Fig. XIX) in the plate 36 of a slide 37, the ends of which project through apertures in the end members 23 and 24.

Each character disk 32 is revolubly mounted within the pocket in its bell crank lever by means of a pin 38, and comprises a gear wheel 39 (Fig. XX), the teeth of which are preferably pointed in order to fit readily into a driving pinion by which it is actuated. On the side of the gear wheel is a symbol ring 40 having teeth 41 on its periphery, of such form and sequence as to represent the symbol of a telegraph code which that particular member is adapted to send, it being understood that each of the character members is adapted, by being provided with teeth 41 of different form and sequence, to send an individual character. The teeth 41 terminates within the circumference of gear wheel 39 in order to be protected thereby, and preferably have straight, radial, rear faces, and inclined forward faces upon which the brush teeth may ride to provide smooth and easy action.

Each symbol ring 40 is provided with a plurality of sets of teeth 41, the number of sets being determined by the space required for the various dot and dash teeth. The inner periphery of the ring has a point 42 for each set of character teeth, arranged to stop or set the disk in proper relation to its releasing device, and the gear wheel 39 has a plate 43 fixed on its face within the ring 40 and provided with notches 44 corresponding in number and arrangement with the points 42, and adapted for coöperation with said points to set the character member.

The bar 28 at the front of the frame 22 is arranged beneath ears 45 on the frame 22 and provided with slots 46.

Pivotally mounted on a shaft 47, carrried by the ears 45, and the bar 28, are the latch levers 49 which correspond in number and arrangement with each of the bell crank levers and character members. Each lever 49 has an arm 50 yieldingly held against the shoulder 33 of the bell crank lever 31 by a spring 51, the one end of which is carried by the hook 34 on the end of the bell crank 31 and the other by a hook 52 at the point of the lever 49; the second arm 53 of the latch lever being projected past the side of the character member and provided with an inturned lip 54 (Fig. XXI) adapted for engagement with the points 42 and the notched plate 43 on the face of the gear wheel forming part of the character member.

As the contacting area of the latch and bell levers is small, I provide a guide for holding both parts in position, comprising a plate 56 at the front of the frame having a slot 57 for each pair of levers and within which said levers may operate freely but in proper relation.

Revolubly mounted in and extending between the end members 23 and 24 at the top of the frame 22 is a shaft 58 having a gear wheel 59 rigidly fixed to one of its ends and meshing with a gear wheel 60 revolubly mounted on a stub shaft 61 on the frame end 24.

Revolubly mounted on shaft 58 is a sleeve 62, the ends of which carry bell crank hangers 63, the lower arms of which project over and adjacent to the plane of the character members and carry an elongated revoluble pinion 64; the upper ends of the hangers being adapted for abutment against the tie rod 25 to hold the pinion out of engagement with the gear wheels of the various character members when the latter are in idle position, a spring 65 being connected with the lower end of one of the levers and with the side member 24 in order to yieldingly tension the pinion toward the character members and retain the upper ends of the hangers against the tie rod to insure proper meshing of the character gear teeth with the pinion.

Rigidly connected with the pinion 64 is a gear wheel 66 which meshes with a gear wheel 67 on the shaft 58, the gear wheel 67 in turn meshing with a small gear wheel 70 rigid on the large gear wheel 71 which is revolubly mounted in point bearings 72 and 73 carried by the frame 24, and an arm 74 depending from the tie rod 25 respectively. The gear wheel 71 meshes with a pinion 75 forming part of the governor shaft 79, which is revolubly mounted in point bearings 71'—77, on the side member 24, and an arm 78 also depending from the tie rod 25, so that all of the gearing carried by the character frame is controllable by a governor which is mounted on the governor shaft 79.

The governor which I show, and prefer to use, comprises wings 80 which are rigidly secured on the shaft 79 and to which the weights 81 are pivotally connected, the weights in turn being yieldingly held in collapsed relation by springs 82, and provided with rollers 83 which are adapted to bear against a disk 84 that is slidably mounted on shaft 79, when the governor weights are expanded to move the disk along said shaft.

Slidably mounted in arm 78, and in an arm 85, also depending from the tie rod 25, is a rod 86 having a leather, or like friction inducing tip 87 adapted for contact by the disk 84 and provided with a spring 88 which bears against the arm 85 and against a collar 89 on said rod to yieldingly tension same toward the governor disk, the spring being sufficiently strong to hold the governor against the tension of the spring motor by which the device is actuated, and lock the machine.

To release the governor, I provide a lever 90, which is pivotally mounted on the end member 23 by a pin 95, one arm of which has a yoke 91 straddling the rod 86 and adapted to bear against a collar 92 slidably mounted on said rod and bearing against a cushioning spring 93 which surrounds the rod and bears against a fixed head 94 on the outer end thereof, the lower end of said lever being extended past the inner end of the gudgeon 20 and adapted for engagement by a pin 96 which is slidably mounted therein. The end of the gudgeon terminates adjacent the cover 5 and is adapted for engagement by a setting cam operable from the exterior of the machine whereby the space between the end of the stop rod 86 and the governor disk may be regulated to determine the speed at which the characters may be sent, as will presently be more fully described; it being apparent, however, that by extending the pin 96 through the gudgeon, on which both the character frame and accumulating cylinder are mounted, that the governor contained within and at one side of the center of the cylinder may be controlled by the apparatus on the exterior of the casing, so that it is unnecessary to uncover the working parts, or have access to the character mechanism, in order to secure such regulation.

In order to limit the speed of the governor, I also provide the end of the character frame with a set screw 98, the end of which is adapted for engagement by the head of the rod 86 when the latter is moved outwardly, to limit the space between the end of the rod and the governor disk and thereby limit the speed of the machine, it being apparent that the screw will positively stop the travel of the rod when engaged thereby, and that should an operator endeavor to increase the speed by manipulation of the first mentioned regulator, the upper arm of the lever 90 will simply compress the spring 93 on rod 86 without shifting the rod past the point fixed by the set screw.

The circuit closer which I prefer to use comprises a brush bar 99 (Figs. XXX, XXXI, and XXXII) which is pivotally mounted in point bearings 100 in the end members 23 and 24 and has a longitudinal groove within which the split brush 101 is mounted, the brush comprising flexible leaves, each having a down-turned free end adapted for engagement with the teeth on one of the character disks; the bar having a lip 102 for each brush leaf, through which a set screw 103 is projected to contact the leaf and adjust same to secure the proper cooperation with the character member.

Fixed to one end of bar 99 is a lever 104 having a lower arm 105 provided with a spring 106, the rear end of which is connected with the hook 107 on the inner end of a pin 108 which extends through the cross bar 27 and has a thumb nut 109 threaded thereon to adjust the tension of the spring and control the "touch" of the circuit closer.

The upper arm 110 of lever 104 has a laterally turned tip provided with a depending boss 111, of rubber, or other insulating material, which overlies the horizontal arm 112′ of a rocker 112, which is pivotally mounted between point bearings 114 that project through the sides of a U-shaped bracket 115 which is rigidly mounted on an insulating base 115′ on the character frame, so that the bracket and the bars connected therewith are insulated from the frame, the upper end of the rocker having a point 116 adapted for contact with a point 117 on a screw 118 which is carried by a web of the character frame 23, the horizontal member of the rocker being provided with a spring 119 which is hung from a screw 120 on an upstanding arm 121 of the U-bracket 115 and is adjustable by a thumb nut 122 to vary the tension of the rocker toward its contact member.

Extending laterally from the U-bracket 115 are ears 123 which carry a pin 124, and pivotally mounted on said pin is an arm 125 which is yieldingly tensioned outwardly by a spring 126 and carries a brush 127 which is adapted to wipe the inner ring 128 of a current collector which is fixed to fiber or like insulating washers 129 carried by the spider webs of the accumulating cylinder, and will presently be more fully described.

It is apparent that when the character members are released and actuated by the elongated pinion to rock the brush bar, the lever 104 will rise and fall from the rocker 112, making and breaking contact between the rocker and the point 117 on the character frame, so that with a circuit wire grounded on the frame an electric circuit is closed and opened therethrough, through the rocker bracket and brush to the collector ring, as the rocker contacts and separates from the point, the insulated mounting for the bracket preventing grounding of the other circuit wire which leads to the collector ring 128.

The accumulating drum, within which the character frame is contained, has setting devices pivotally mounted in its circumference and adapted for projection into the interior, as will presently be described in detail. Each of the setting devices, however, is adapted, when rocked into active position, for engaging the lower end of the bell crank lever which carries its particular character member so that the latch 49 will catch the upper end of the lever and hold same until the character has been completed. In order to positively lock the bell crank lever and setting devices together until the character has been completed, I provide a latch mechanism comprising a latch bar 130 which extends entirely across the character frame and is pivotally mounted on a rod 131 carried by bearings 132 that project rearwardly from the slide 37 and have upwardly directed ears 133 provided with a concaved front face (Fig. XIX), the bar 130 being provided with a depending web 134 having slots 135; the tongues of the plate being in front of the slotted portions of the slide 37, so that under ordinary conditions the lower ends of the bell crank levers will lie directly back of the tongues.

Pivotally mounted on the ends 23 and 24 of the character frame are hangers 136 which are connected by a cross member 137 that is adapted to overlie the lower ends of all of the bell crank levers 31, each of the hangers having an inturned stud 138 lying back of the adjacent ear 133 of the cross bar 130 so that when the hangers 136 are tipped upwardly by the engagement of any of the bell crank levers 31 with the cross member 137, the studs will engage the rear edges of said ears and tip the cross bar 130 downwardly so that the proper tongues thereon will engage the trip on the accumulating drum which has rocked the bell crank lever through which the hangers were lifted.

The cross bar 130 is normally, yieldingly held in elevated position by a spring 130' which is connected with the bar and with a pin 139 on the frame end 23, so that the locking action just described is against the tension of the spring and will be overcome, to return the parts to initial position, as soon as the positive pressure on the cross member is removed.

The object in having the guide member 37 slidable in the frame is to provide for shifting the trip ends of the bell crank levers out of the path of the setting devices so that the drum may be moved backwardly when it is desired to eliminate a message or to repeat all or part of a message; it being apparent that if the setting devices in the drum were left in their active position, and the character frame returned to the position from which it started to contact the trips, and were again moved forwardly, that the character members, theretofore actuated, would repeat in the same order. In order to accomplish this result, I provide the slotted plate 134, the tongues of which are adapted to engage the bell lever trips, (when the plate is tipped) the mounting of the bell crank levers being sufficiently loose to allow the levers to shift when the slide is moved laterally, so that they will avoid the active setting devices. Inasmuch, however, as it is seldom necessary to repeat a message, I provide for normally retaining the slide in position by providing same with a spring 140 which is connected with the body of the slide 37 and with a pin 141 on the frame end 24, the adjacent end of the slide having a boss 142 adapted for engaging the inner face of the frame end to limit the outward movement thereof under tension of the spring and retain the slotted parts in position for performing their functions.

To move the slide against the tension of its spring, I provide a lever 143 which is pivotally mounted at 144 on side members 24 (Fig. XXIII) and between ears 145' on a disk 145, which is revolubly mounted in a collar 146 on the gear wheel 147 said gear wheel being carried by a sleeve 148 on the gudgeon 21; said sleeve being held to the gear wheel by the collar 146, so that it is adapted to move laterally when the gear wheel is moved, as will presently be more fully described.

The accumulating drum, within which the character frame is mounted, comprises spiders 150 and 151, which are revolubly mounted on the gudgeon 20 and the sleeve 148 on the gudgeon 21, and carry the drum 152, which is preferably formed in two parts, so that it may be separated to afford access to its interior, and has a tongue and groove joint 153 (Fig. II). A ratchet 155 (Figs. IV and XLVIII) which extends continuously around the drum at one end, is adapted for engagement by an escapement 156 (Figs. I and V) whereby tension from the motor, tending to revolve the drum is controlled through the key levers, presently described.

The drum 152 contains a circumferential series of slots 157 (Fig. XXXVIII) for each character which the machine is adapted to send, the slots in the different series being arranged in transverse alinement, and each slot containing a pin 158 upon which a trip setting dog 159 is pivotally mounted, the slots and trip dogs in the various series being arranged in alinement with the normal positions of the bell crank character levers and latch tongues in order to properly coöperate therewith, and so that a single pin may extend through all of the slots in a transverse row.

Each of the setting dogs comprises a body portion 160 (Figs. XXXIV—XXXVIII) having an aperture 161 just back of its center of mass, an upwardly and forwardly projecting finger 162 which is adapted for engaging and rocking a character lever, a laterally turned ear 164 which acts as a stop to limit the setting travel of the dog and is adapted for engagement by the rear end of the proper key lever to rock the dog to its setting position, and a backwardly and downwardly projecting finger 163 which is adapted for engagement by a wiper to restore the dog to initial position. One face of the dog has grooves 165 diverging from the pivot aperture and adapted for receiving the nose 166 of a spring 167, which is also mounted on the pin 158 within the drum slot, and has a leaf 168 provided with ears 169 which overlie the inner and outer faces of the drum to hold the spring rigidly in position.

Fixed to the non-conductive washers 129 on the webs of the drum spider 150, by pins 170, is an outer current collecting ring 171 (Figs. XXXII and XXXIII), and mounted in a non-conductive bushing 172, on a bracket 173, which is pivotally mounted on the main frame 1, and yielding tensioned inwardly by a spring 174 is a brush 175 which is connected with the insulated binding post 9 by a wire 176.

On the opposite end of the sleeve 148 which carries the gear wheel 147 and disk 145, whereby the repeat slide lever is actuated, is a gear wheel 177 which meshes with a gear wheel 178 on a pin 179 slidably mounted in a bearing 180 in cover 5 and provided with a knob 181 at its outer end, the gear wheel 178 having flanges 182 on its opposite faces projecting over the faces of the gear wheel 177, and parts directly connected therewith, will be moved laterally without breaking the connection with the gear wheel 178.

It is apparent that when the parts are moved laterally, as described, the lever 143 will be rocked to move the slide 37 against the tension of its spring, so that the tongues on the slide member will move the bell lever trips out of line with the trip dogs on the accumulating drum, so with the parts in this position, rotation of the knob will rotate the character frame so that the latter may be moved back to a starting position without changing the position of the accumulating drum, and so that the driving connection with the character frame is reestablished, the contacts of the character levers with the setting dogs will be repeated, and the character members again operated to repeat a message.

One-half of the lateral surface of gear wheel 147 meshes with the gear 60, which is the first in train leading to the governor and to the pinion 64, and the other half meshes with an intermediate gear 183 (Figs. I and IV), which is revolubly mounted on a stub shaft 184 on the spider 151. The gear wheel 183 meshes with the gear wheel 185 rigidly mounted on a shaft 186 revoluble in one of the arms of the spider, the opposite end of said shaft having a gear wheel 187 fixed thereto and meshing with one-half the lateral surface of a large gear wheel 188 revolubly mounted on a collar 189 on the bearing 19 of the main frame. The other half of the lateral surface of gear 188 meshes with an intermediate gear 193, on a stub shaft 194, on the main frame, which in turn meshes with a large gear wheel 192, revolubly mounted on the stub shaft 195, also carried by the main frame and provided with a small gear wheel 196 which is engaged by a large gear wheel 197 on a motor 198 which may be of any suitable construction, but is preferably carried by bearings 199 on the main frame.

The motor (which is preferably of a spring type) has a gear wheel 200 at the end opposite the wheel 197 (Fig. II), which meshes with a gear 201 on a shaft 202 (Fig. XLV) which is revolubly mounted in a bearing 203 on the case 5.

Fixed on the projecting end of shaft 202 is a ratchet wheel 204, and revolubly mounted on said shaft is a crank 205 having a case 206 inclosing the ratchet wheel and adapted for revoluble movement in a groove 207 in the end of the bearing; the case and crank being held to the shaft by a nut 208.

In the head of the crank arm is a pocket 209, and pivotally mounted in said pocket is a pawl 210, which is yieldingly held in engagement with the ratchet wheel 204 by a spring 211, so that the crank is operative in but one direction.

It is apparent, therefore, that when the motor is wound up by the crank, it will tend to revolve the gear wheels 197, 196, 192, 193 and 188, the latter being the last in train from the motor to the accumulating drum, and that tension from the wheel 188 is transferred to the wheel 187, thereby exerting a radial force on the drum in the direction of the arrow (Fig. I by virtue of a resistance offered the gear 187), and that simultaneously with this radial tension, power is transferred through the gear wheel 187 on the shaft 186, and wheels 185, 183 and 147, to the gear wheel 60, on the character member frame 22, through wheels 59, 67 and 66 to the elongated pinion 64 and through the wheel 70, which meshes with the wheel 67 and wheels 71 and 75 to revolve the governor.

The gear wheel 60 is heretofore described as the last in train from the governor and is controlled thereby, so that all of the character mechanism, the gear 183, and transmission to and including the gear 187, is locked by the governor, when the latter is in locking position. It is apparent, however, that as the character mechanism and the accumulating drum are both revolubly mounted on the gudgeons, that tension from the motor will tend to revolve the drum in the direction of the arrow (Fig. I), and that when the character parts are rigidly connected with the drum, all of the parts may be revolved backwardly, as indicated, irrespective of the locking or unlocking of the governor. It is also apparent that if, when the gear wheel 147 is moved laterally to shift the repeat mechanism, it should entirely leave its contact with the gear wheel 60, with which half of its surface normally meshes, that the connection with the governor would be broken and the motor would be free to race. In order to obviate such action, I provide the outer face of the gear wheel 147 with a clutch face 212, which is adapted to mesh with a similar face 213 in the adjacent spider 151 when the repeat mechanism is shifted, and thereby lock the motor with the drum until the repeat mechanism is returned to its original position, the gear teeth on the gear wheels being preferably beveled to facilitate their meshing when the gear 147 is returned to active position.

It is apparent that when the gear wheel 147 is shifted out of mesh with the gear wheel 60 the character member frame may be revolved without actuating the governor and the intermediate gearing, thereby relieving the operation of the tension required for operating such mechanism, and also making it possible to revolve the frame while the governor is locked.

I also provide the machine with means for indicating and regulating the speed of the governor, the preferred form of such mechanism comprising a cam 220 (Figs. XXV and XXVII) which is rigidly mounted on a shaft 221 revoluble in the case 5 in such position that the face of the cam may engage the outer end of the rod 96 (Fig. XXIV).

Pivotally mounted on shaft 221, on the outside of the case is a stop member 222 having a finger grip 223 at one end and a pawl 224 and a stop 225 at the opposite end adapted for coöperation with a dial, presently described.

Rigidly fixed on shaft 221 is a pointer 226 which is adapted for movement over the dial, and a knob 227 by which the shaft, and the cam and pointer which are rigidly mounted thereon, are actuated.

The dial, above mentioned, comprises a curved plate 228 which is set out from the side of the case, so that the stop pawl may project therebetween and has an inturned flange provided with notches 229 within which the pawl is adapted to seat to yieldingly hold same in a set position.

It is apparent that with this construction the stop member may be set for any desired speed of the governor and that when the pointer 226 is turned it will engage the stop lip 225 so that the cam is held in position for securing a desired speed of the governor, but that the stop member may be moved forwardly to secure a higher speed by forcing the pointer against the stop lip or by moving the stop member through the finger piece 223. The stop may be set back by means of the finger lip to again set the governor for a lower speed.

The keyboard which I prefer to use with the machine comprises levers 235 (Figs. V and XIII), each of which has a slot 236 straddling a rod 237 which is mounted in a standard bracket 238 on the base of the frame 1 and projects through slots 239 in the standard bracket into which each of the key levers is projected. The rear end of each of the character releasing key levers is projected through a similar slotted standard bracket 240 to the rear of the brackets 238 and terminates in such position that the rear edge of each underlies the laterally turned ears 164 in one series of setting trip dogs 160, (Fig. XXXVIII), the end of each key lever having a downcut, rearwardly projecting portion extended beneath the rib 241 of the universal escapement and correcting shaft 242 on which the escapement 156 is rigidly fixed, the forward ends of all of the key levers being extended through slots 243 in a front plate 244 mounted on the forward end of frame 1.

In the base of frame 1, immediately back of the standard bracket 238, are apertures 245, and projecting through said apertures are springs 246, the upper end of each of which is connected with a pin 247 on one of the key levers and the lower end of which is connected with a loop 248 (Fig. XV) on an adjusting bar 249 which is located below the base of the frame and has an upturned lip 250 on its forward end projected into a cross groove 251 in the base, the rear end of said member having an offset lip 252 provided with a set screw 253 which is adapted for abutment against the base of the frame and whereby the tension of the spring may be regulated to adjust the touch of the key lever controlled by that particular adjustment.

At each side of the bank of active key levers 235 are levers 254—255, similar in construction and mounting to those already described, which extend to the front of the keyboard and carry a space bar 256, the lever 254 preferably extending but a short distance rearwardly of the bracket 238, and the lever 255 being adapted for releasing a blank character member so that the machine may be operated idly to produce the required spacing between words or characters. The bars 254 and 255 are preferably connected by a torsion rod 258 to provide a desirable rigid connection within the frame.

The universal escapement and correcting device preferably comprises a shaft 259 which is pivotally mounted in point bearings 260 at the sides of the frame 1, rib 241 being integral therewith and projected radially therefrom, the upper surface of the rib verging into the shaft on an easy curve in order to afford space for pivotal movement of the drum trip dogs, and to provide for returning the trip dogs when the drum is back-spaced, the lip 241 being normally yieldingly tensioned downwardly against the offset ends of the key levers by a spring 262 which is connected with a hook 261 on the shaft 259 and with a hook bolt 263 which is slidably mounted in a bracket 264 on the frame 1, and has a thumb nut 265 whereby the spring tension may be adjusted to regulate the touch of the key levers.

The escapement pawl 156, heretofore mentioned, is rigidly fixed on the shaft 259 in position for engaging the ratchet on the drum, so that whenever the escapement shaft is rocked by one of the key levers the pawl is actuated to release the drum for one step under the influence of the motor. Also pivotally mounted on the rod 237 are levers 270, the forward ends of which are turned upwardly within the front of the frame and provided with a connecting bar 271 which extends across the bank of key levers and has a horizontal, cushioned flange 272 at its lower edge, the upper edge of the bar having a raised track 273 over its central portion provided with inclined approaches 274, and having a hook 275 near its right-hand end. Each of said levers is provided with a spring 246 similar to that provided for each of the other key levers, whereby the bar levers are yieldingly tensioned upwardly, and each of said bar levers is connected with a stop bar 277 which extends beneath the active key levers, and is adapted for engagement by said key levers when the tram is at either end of the track 273, to increase the tension required for lowering the key levers, and also to lock the machine under conditions hereafter described.

Projecting inwardly from the upper edge of plate 244 is a flange 278 having a rail 279 depending over the track 273. Located between the track 273 and rail 279 is a tram 280 comprising a frame 281 (Figs. V, X and XII), having flanged wheels 282 adapted for travel along the depending rail 279, and a single flanged wheel 283 adapted for travel along the upper edge of bar 271 and over the raised track 273.

A finger 285 projects from the forward face of the tram frame, through a slot 286 in plate 244 and over a dial plate 287 bearing suitable characters to indicate by the position of the tram, as will presently be shown, the number of character members which have not yet completed their function of sending a symbol.

A wire cable, or the like, 288 (Fig. IV) is secured to each end of the tram frame 281 and run through an aperture 289 in the sides of the main frame and over sheave wheels 290 on the outside brackets 291 to the drum 292 on gudgeon 21 and 292′ on gudgeon 20 respectively; the cable being extended above one drum and below the other and wound thereon so that as the gudgeons revolve one of the cables may be paid out and another wound on its drum, to move the tram transversely along its track.

Each of the drums 292—292′ has an ear 294 (Fig. XLVII) thereon adapted for engagement with a pin 294′ on the main frame whereby the character member frame may be held in initial position and stopped in such position after each period of travel.

Pivotally mounted on and depending from the track 279 is a hook 293 which normally clears the hook 275 on the track 271, but is adapted for movement into engagement therewith when moved from behind by the tram frame when the latter has passed over the inclined track way 273, and thereby lock the levers 270 in their elevated position, so that the stop bar 277 will hold the key levers and prevent their movement to release setting trips on the revoluble drum.

On the rear face of the tram frame 281 is a bracket 295 having a roller 296 revolubly mounted thereon and adapted for engagement with the arms 299 on the rod 298 which is revolubly mounted in bearings 297 on the flange 278 for the purpose of rocking said rod to raise the clapper 300 so that it may fall against a bell 301 and thereby indicate to the operator that the machine is reaching its accumulative limit or is nearing its initial position.

I provide for back-spacing the drum, to correct an error or erase an entire message, through the medium of a key lever 303 which is pivotally mounted on the rod 237, as are the other key levers, and has a touch button 304 somewhat larger than those on the other keys to distinguish it therefrom. The lever 303 is arched downwardly through a slot 305 in the base of the frame 1 in order that it may pass beneath the shaft 259, and has a pawl 306 pivotally mounted on its rear end, the loose end of the pawl being adapted for engagement with the ratchet 155 on the drum, so that when the key lever is actuated the pawl will push against the drum and move same backwardly one space against the tension of the motor, said pawl being provided with a stop flange 307 which is adapted for engagement with the top edge of the lever, and with a spring 307′ which allows the pawl to yield when drawn backwardly over the ratchet, it being apparent that the wiper will reseat the setting dogs when the drum is revolved.

I also provide the machine with a hand key for use in case of an emergency, or preference, and which is provided with a switch whereby it may be thrown into or out of operative relation to its contact point, the structure which I prefer to use comprising a sleeve 308 (Figs. XL, XLI, XLII) having a slotted head 309 and a downwardly facing shoulder 310, at its upper portion and slots 311 near its lower end, the head and shoulder being adapted to overlie a boss 312 on the casing 6 and the entire device being held within the boss by a nut 313 on the lower end of the sleeve.

Slidably mounted within the sleeve is a key pin 314 having a button 315 on its upper end and having a wedge-shaped lift block 316 fixed thereto above the head of the sleeve, a pin 317 being fixed thereto and adapted for travel within the slot in the sleeve 308 to limit the vertical movement of the pin. The key pin projects through an aperture 321 in a flat spring 320 which is secured to a boss 319 on the case 6 and has a shoulder 318 adapted to bear against the top of said spring and whereby the key pin is yieldingly retained in its elevated position.

Immediately beneath the lower end of key 314 is a contact point 322 which is carried by a bracket 323 on a boss 325 on the frame 6 and provided with a lock nut 324 for insuring its constant position in the bracket, the pointer 322 being connected with the binding post 9 by a wire 326.

Surrounding the sleeve 308 and bearing against the top of the boss 312 and the shoulder 310 is a washer 327 which serves as a bearing for a collar 328 which surrounds the sleeve and has upturned dogs 329—329' at its opposite edges, the dog 329 being projected through the slot 309' in the head 309 on the sleeve 308 to hold the sleeve 328 and the other integral with a spring leaf 330 formed by slitting the body of the collar. Surrounding the sleeve, between the collar 328 and the head 309, is a hub 331, having peripheral notches 332 for receiving the spring dog 329', and having a recess 333 for receiving the integral dog 329, said hub being also provided with a hook arm 334 adapted for overlying the wedge-shaped block 316 on the key pin, and a handle 335 having a lever 336. With this construction, when the lever 336 is moved to one limit of its travel the key pin is free to rise and is yieldingly raised by the spring 320, so that it may be operated in the ordinary manner.

When, however, the line is to be closed through the instrument, the lever is moved to its opposite limit, moving the hook arm 334 over the wedge block on the pin and holding the pin on contact with the point 322.

It is apparent that when the integral dog 329 is engaged by the handle 335, or by the opposite end of the recess 333, the hub will be stopped, and that the spring dog 329' will yieldingly engage the notches 332 to hold the hub against accidental movement.

In order to prevent the actuation of more than one of the key levers at a time, I provide the front plate 244 with tumblers 338, each of which has a shank located between adjacent slots 243 in the plate and has a head pivotally mounted on a pin 339 projecting from the front face of said plate. Each of the tumblers has a block 340 at its lower end of such width that when one of the key levers is depressed and passes between the blocks of adjacent tumblers, all of the tumblers in the set are moved laterally and the spaces closed, so that should a second lever be moved downwardly it will engage the tops of the adjacent tumbler blocks and be held against complete downward movement.

A hood 341 incloses the tumblers to prevent interference with their operation, said hood being secured to the front plate by screws 342 and provided with slots 343 through which the key levers may project.

In using the apparatus, presuming the parts to be constructed and assembled as described, the proper connections made with a line wire and the motor active and held by the governor control latch 227, a message is sent, as follows: The operator first releases the governor by turning the knob 227 to release the governor disk from tension of the rod 86 so that the elongated pinion 64 is revolved constantly to drive whatever character member disk may be thrown into mesh therewith, the release of the governor, however, having no effect on the accumulating drum, as the latter is held by its escapement pawl. When the first letter of the message is struck the rear end of the key lever for that letter engages the laterally turned ear 164 of one of the setting dogs 159 in the accumulating drum in the series for the particular character represented by the key lever and rocks said dog so that its contact portion projects inwardly into the drum, at the same moment actuating the escapement 156 so that the motor is allowed to move the drum one space. As soon as the drum is moved one space, radial tension on the character frame, which is revolubly mounted within the drum, but tensioned backwardly relative to the movement of the drum, throws the frame back toward its initial position, so that the point of the bell crank lever 31 engaging the raised inner portion of the dog 159 causes the lever to rock upwardly, thereby moving all of the parts in that set to the position shown in Fig. XVII; that is the lifting of the lower arm of the lever causes the arm to engage the cross rod 137, lifting said rod so that the studs 138 on the hangers 136 rock against the ends of the cross member 130 and move the latter downwardly into engagement with the trip member 159 to hold the latter and prevent the release of the bell crank lever or further motion of the drum relative to the character frame until the character represented by that particular lever has been sent. Simultaneously with the action carried through at the lower end of the bell crank lever, the upper end of the lever is also lifted so that the gear wheel on the character disk carried by said bell crank lever is moved into engagement with the constantly revolving pinion 64, and immediately begins to revolve under the influence of said pinion, the lifting of the upper end of the bell crank lever freeing the latch 49, so that its arm 50 is moved below the edge of the offset portion 33 to hold the lever up, and its arm 53 is moved outwardly into the path of the inturned teeth 42 on the cam face of the character disk. While the parts are in this position, the character teeth 40 are engaged by the brush 101, the rise and fall of the brush making and breaking a circuit through the circuit closer, as is readily apparent from the drawings and from the description of such part heretofore given.

Owing to the fact that there is an inturned tooth 42 for each set of character teeth on the disk 40, when the character has been sent, the tooth 42 engages the arm 53 of the latch 49 and moves same outwardly until the arm 50 may move over the end of the offset portion of the bell crank lever, the arm 53 then moving toward the center of the character disk and engaging the notched portion 44 to hold the character disk in set position, the notches 44 having inclined faces 44' against which the teeth 54 are adapted to impinge to turn the character disks as the latter are lowered with the bell crank lever, so that the disk is always turned to a set position as it comes to rest, the length of the inclined face determining the travel of the disk under influence of the tooth. It is apparent that with this mechanism any error in arrangement of the sets of character member teeth are automatically corrected during the resetting operation, and the character disk may always start its active operation from the proper position. As soon as the bell crank lever has been released by the character disk the parts at the lower end of the lever return to initial position and the drum and character disk frame are free to move in opposite directions relative to each other so that the next active dog on the drum may engage its bell crank lever and cause the actuation of the proper character member.

It is apparent that while the drum and character frame are mounted independently of each other, the transmission from the drum to the character frame will tend to move the latter forwardly therewith, whereas the radial tension on the character frame tends to return the latter to its initial position in a direction opposite to that of the radial tension of the drum, the character member frame being stopped at its initial position, and the drum being adapted for actuating the character member levers from any position, and having no fixed point, but being freely revoluble or "floating." For this reason, when the escapement allows the drum to move forwardly, no effect is had on the character frame or its parts, as they merely revolve around the same center as the drum, so that should the keyboard be operated rapidly the drum will move one step for each key actuation, and if the sending of the characters is slower than the actuation of the keyboard, the character frame will be moved with the drum from its initial position. Inasmuch as the frame is moved positively with the arm of the frame, because of the engagement of drum dogs with the bell crank levers of the character members, and as such movement is independent of the actuation of the character members themselves, it is apparent that the frame may be moved with the drum a number of spaces while a single character is being sent, and that as radial tension returns the frame to its initial position, its character members are set by the accumulated trip dogs, in the sequence in which the dogs were set by the keyboard levers. It is apparent that in this way the accumulation may take place without interfering with the sending of the characters and that the accumulation is only limited by the number of trip dogs in each series in the drum.

Should the operator strike the wrong key, the error may be corrected by means of the back spacer which moves the drum backwardly, so that the finger 163 of the trip which has been inadvertently rocked, will engage the shaft 259 and by it be returned to its initial position, after which the operator may proceed to send the message correctly, the shaft 259 and back spacer key being so arranged that as the finger 163 passes into the curve of the lip 241 the shaft is rocked so that the lip pushes against the finger and helps to replace the dog.

Should it be desired to repeat a message, it is, of course, necessary to return the character frame to position for starting the part of the message to be repeated without interferring with the set positions of the trip dogs. This is accomplished by means of the knob 181 which may be pulled laterally to shift the collar 148 and lever 143 so that the slide 130 is moved to shift the lower arms of the bell crank levers out of position for contact with the trips on the drum, after which the character member frame may be revolved backwardly by means of said knob until a starting position is reached, after which the slide may be returned to its initial position and the machine allowed to operate as before, the springs by which the dogs are held yieldingly in set position preventing the accidental return of said dogs.

It is apparent that after the message has been sent and while the drum is moving under radial tension of the transmission, that the shaft 259 will wipe the trip dogs and move same back to their lowered positions, so that they may be reset for succeeding operations, the resetting taking place either immediately after the message is sent or at such time as the part of the drum containing the set trips is moved over the shaft 259.

The indicator at all times shows the number of accumulated trips, due to the fact that as the character member frame revolves it winds one rope 288 on its drum and pulls the tram across its track, the bell sounding as the character member frame approaches its limit. After the tram has passed over the raised track, the bar 271 is raised by its springs 246 so that whenever a succeeding key lever is lowered, it must push said bar downwardly, thereby stiffening the action of the key lever and indicating to the operator the position of the drum. As the drum approaches its limit of accumulation the tram moves the hook 293 beneath the hook 275 on the cross bar 271 and locks all of the key levers so that they cannot be depressed to set new trips, thereby requiring the operation to be discontinued until the accumulator has been relieved.

In regulating the speed of the governor, the rod 86 is moved outward by means of lever 90 against the tension of spring 88. If, however, it is desired to fix a minimum speed according to rules or regulations, the set screw 98 is turned so that the rod cannot be moved any further than a certain limit, at which point the force of the lever 90 if moved farther will be taken up by spring 93, which is enough stiffer than the spring 88 to always allow the latter to yield first.

If the operator is accustomed to working at a certain speed he may set the stop 225 for that speed. With the stop set at the proper point, when he revolves the knob 227, to release the governor, he turns same until the pointer touches the stop, thereby obviating the necessity of watching the indicator each time the machine is started. In case he desires to transmit a little faster he may turn the knob 227 and move the pawl 224 along notches 229, or he may move the finger grip 223 in either direction.

While I have described the operation of the machine with the governor released for the entire period during which the keyboard is operated, it is apparent that the message may be sent on the drum before the governor is released, so that all of the characters are accumulated within the drum before any of the characters are sent. After such accumulation the governor may be released so that the character frame and the members carried thereby are operated as the parts assume their normal position under the radial tension.

It is apparent that the description of structure and operation is that preferred and that variations may be made in both structure and operation without departing from the spirit of the invention.

Having thus described my invention, what I claim as new therein and desire to secure by Letters-Patent, is:

1. In a telegraph transmitter, an individual character member for each of a plurality of designated characters, a plurality of setting devices for each character member, and means for successively actuating said setting devices to set said character member in operative position.

2. In a telegraph transmitter, an individual character member for each of a plurality of designated characters, an individual group of setting devices for successively actuating each character member, and means for successively actuating the setting devices of each group prior to the actuation of the character members.

3. In a telegraph transmitter, an individual character member for each of a plurality of designated characters, a plurality of individually operable setting devices for each character member, and means for successively actuating the setting devices to set said character members in operative position.

4. In a telegraph transmitter, a plurality of independently operable character members each having indents corresponding to a telegraphic character, a circuit closer adapted for actuation by said indents, a plurality of independently operable setting devices for tripping each character member into functional position, and means on each character for determining the functional period of that member.

5. In a telegraph transmitter, an individual character member for each of a plurality of designated characters, a set of independently operable setting devices for each character member, and a single member for actuating any of the setting devices in its set.

6. In a telegraph transmitter, a plurality of independently operable character members, a circuit closer adapted for actuation by any of said character members, a plurality of duplicate setting devices for each character member and a single member for actuating said setting devices.

7. In a telegraph transmitter, a plurality of independently operable character members, a circuit closer adapted for actuation by any of said character members, a plurality of independently operable setting devices for each character member, and a single key lever for actuating any of the setting devices for each character member.

8. In a telegraph transmitter, character members, a selecting mechanism adapted for travel relative to said character members, and having a plurality of independently operable setting devices, means for successively tripping the setting devices to engage the character members, and means for moving said selecting mechanism to trip said character members into operative position.

9. In a telegraph transmitter, character members, a carriage adapted for travel past said character members, groups of setting devices carried by the carriage and adapted for selective engagement with said character members, and means for successively tripping the setting devices to engage said character devices.

10. In a telegraph transmitter, character members, an individual set of independently operable setting devices for each character member, and separate means for rocking the setting devices in each individual set.

11. In a telegraph transmitter, character members, a carriage, individual sets of independently operable setting devices in said carriage, means for actuating any one of the setting devices of any set and means for moving said carriage to cause active setting devices to trip said character members into operative position.

12. In a telegraph transmitter, character members, a plurality of setting devices for each character member, and a key lever for successively setting the setting devices of each set of setting devices.

13. In a telegraph transmitter, a plurality of character members, a floating carriage, a set of setting devices on said carriage for each character member, and a separate key lever for actuating all of the setting devices in each set.

14. In a telegraph transmitter, a floating carriage and an independently movable character member frame, a character member mounted in the frame, setting devices mounted in the carriage, means carried by the frame and adapted for actuation by the setting devices to release the character member, and means for controlling travel of the carriage and frame.

15. In a telegraph transmitter, a character member, a selecting mechanism, a driver for actuating the selecting mechanism to set the character member, and mechanism adapted for actuation by the driver, whereby the character member is actuated to transmit a character independently of the rate of travel of the selecting mechanism.

16. In a telegraph transmitter, a character member, a selecting mechanism, a driver for actuating the selecting mechanism to set the character member, and mechanism adapted for actuation by the driver, whereby the character member is moved oppositely from the selecting mechanism to transmit a character, irrespective of the rate of travel of the selective mechanism.

17. In a telegraph transmitter, a character member frame and carriage adapted for independent travel, a character member mounted in the frame, setting devices mounted in the carriage, means for actuating the setting devices, and means for positively driving the character member independently of the travel of the carriage.

18. In a telegraph transmitter, a character member frame and a carriage adapted for independent travel in opposite directions, a character member mounted in the frame, setting devices mounted in the carriage, and means for releasing the carriage and actuating said setting devices independently of the travel of the character member frame.

19. In a telegraph transmitter, a character member frame and a carriage adapted for independent travel, a character member mounted in the frame, setting devices mounted in the carriage, means for actuating said setting devices, means for positively driving the character member independently of the travel of the carriage, and means for controlling travel of the carriage.

20. In a telegraph transmitter, a character member, selecting mechanism, a common driver for the character member and selecting mechanism, and means whereby the selecting mechanism is tensioned and the character member moved relative to each other.

21. In a telegraph transmitter, a character member, selecting mechanism, a common driver for the character member and selecting mechanism, and means whereby the selecting mechanism is tensioned and the character member moved in opposite directions.

22. In a telegraph transmitter, a character member, selecting mechanism, a common driver for the character member and selecting mechanism, means whereby the selecting mechanism is tensioned and the character member moved in opposite directions, and means for releasing the selecting mechanism.

23. In a telegraph transmitter, a character member, a selecting mechanism, a common driver for the character member and selecting mechanism, means whereby the selecting mechanism is tensioned and the character member moved in opposite directions, and means for releasing the selecting mechanism to its tension independently of the movement of the character member.

24. In a telegraph transmitter, a character member frame and a selecting mechanism adapted for revolution on a common axis, a common driver for moving the character member frame and selecting mechanism in opposite directions, a character member in said character member frame, and means controlled by said character member for changing the direction of revolution of said character member frame.

25. In a telegraph transmitter, a character member frame and a selecting mechanism adapted for revolution on a common axis, a common driver for moving the character member frame, and selecting mechanism for changing the direction of revolution of the character member frame.

26. In a telegraph transmitter, a character member frame and a selective mechanism adapted for revolution on a common axis, a common driver for tensioning the character member frame and the selecting mechanism in opposite directions, a key for releasing said selecting mechanism to its tension, means carried by the selecting mechanism for moving the character member frame in the same direction, and means carried by the character member frame for releasing said frame from said selecting mechanism.

27. In a telegraph transmitter, character members and a selecting mechanism mounted on a common support, a prime mover for actuating both the character members and the selecting mechanism, and transmission between the prime mover and character members whereby a selected character member is actuated independently of the general actuation of all of said members.

28. In a telegraph transmitter, a movable character member frame, character members mounted in the frame, means for actuating the character members independently of the movement of the frame, a selecting mechanism adapted for actuation independently of the frame and character members, means adapted for shifting the character members, and setting devices in the selecting mechanism adapted for operative engagement with said means.

29. In a telegraph transmitter, character and selecting mechanism independently mounted on a common axis character members in said mechanism, and setting devices in the character and selecting mechanism respectively adapted for coöperation to determine the actuation of individual character members.

30. In a telegraph transmitter, character and selecting mechanism adapted for rotation on a common axis and arranged one within the other character members in said mechanism, and means in the character and selecting mechanisms for determining the actuation of individual character members.

31. In a telegraph transmitter, character mechanism including individually operative character members, a selecting mechanism including setting devices adapted for determining the actuation of the individual character members, and a positive driving mechanism adapted for positively actuating the individual character members and for actuating the character and selecting mechanisms by radial tension from the positive driving mechanism.

32. In a telegraph transmitter, character members, a selecting mechanism, a prime mover for actuating both the character members and the selecting mechanism, transmission between the prime mover and the character members whereby a selected character member is actuated, and all of the members and the selecting mechanism moved relative to each other.

33. In a telegraph transmitter, character members, a selecting mechanism, a prime mover for actuating both the character members and the selecting mechanism, transmission between the prime mover and the character members whereby a selected character member is actuated, and all of the members and the selecting mechanism moved relatively to and independently of each other.

34. In a telegraph transmitter, a character member frame and selecting mechanism concentrically mounted and adapted for movement independently of each other, character members movably mounted in said frame, a prime mover, gearing connecting both the selecting mechanism and the character member frame with the prime mover, means carried by the character member frame for resisting said gearing to induce radial tension in the selective mechanism and character member frame; and means for actuating individual character members.

35. In a telegraph transmitter, a character member frame and selecting mechanism concentrically mounted and adapted for movement independently of each other, character members movably mounted in said frame, a prime mover, gearing connecting both the selecting mechanism and the character member frame with the prime mover and including a transmission member having eccentric mounting on one of the concentrically mounted parts, and means for resisting said gearing whereby radial tension is exerted on said part simultaneously with the driving tension on the character members.

36. In a telegraph transmitter, a character member frame and selecting mechanism concentrically mounted and adapted for movement independently of each other, character members movably mounted in said frame, a prime mover, gearing connected with the prime mover for driving the selecting mechanism and character members and including a transmission member having eccentric mounting on the frame and selecting mechanism respectively whereby radial tension is exerted on the frame and selecting mechanism simultaneously with the driving tension on the character members.

37. In a telegraph transmitter, a character member frame and selecting mechanism concentrically mounted and adapted for movement independently of each other, character members movably mounted in said frame, a prime mover, gearing connecting both the selecting mechanism and character members with the prime mover and including a transmission member having eccentric mounting on the frame and selecting mechanism respectively whereby opposite radial tension is exerted on the frame and selecting mechanism simultaneously with the driving tension on the character members.

38. In a telegraph transmitter, a character member frame and selecting mechanism having concentric mounting and character members eccentrically mounted in the frame, and adapted for actuation from the selecting mechanism.

39. In a telegraph transmitter, a character member frame and selecting mechanism having concentric mounting, character members eccentrically mounted in the frame, and adapted for actuation from the selecting mechanism, and a prime mover adapted for actuating the character members and including a transmission member having mounting on the selecting mechanism whereby the selecting mechanism and character member frame are yieldingly tensioned relative to each other.

40. In a telegraph transmitter, a character member frame and selecting mechanism having concentric mounting and character members eccentrically mounted in the frame, and adapted for actuation from the selecting mechanism, a prime mover adapted for actuating the character members and including a transmission member having mounting on the selecting mechanism, and means on the character member frame for resisting the prime mover, whereby the selecting mechanism and character member frame are yieldingly tensioned relative to each other and having eccentric mounting on the selecting mechanism.

41. In a telegraph transmitter, a character member frame and selecting mechanism having concentric mounting, character members eccentrically mounted in the frame and adapted for actuation from the selecting mechanism, a prime mover adapted for actuating the character members and including a transmission member having mounting on the selecting mechanism, means on the character member frame for resisting the prime mover, whereby the selecting mechanism and character member frame are yieldingly tensioned relative to each other and having eccentric mounting on the selecting mechanism, and an escapement for controlling the travel of the selecting mechanism.

42. In a telegraph transmitter, a character member frame and selecting mechanism having concentric mounting and character members eccentrically mounted in the frame, and adapted for actuation from the selecting mechanism, a prime mover adapted for actuating the character members and including a transmission member having eccentric mounting on the selecting mechanism means on the character member frame for resisting the prime mover; whereby the selecting mechanism and character member frame are yieldingly tensioned relative to each other, an escapement for controlling the travel of the selecting mechanism, and key levers for setting the selecting mechanism and actuating said escapement.

43. In a telegraph transmitter, a character member frame and selecting mechanism concentrically mounted one within the other, the latter comprising independent trips and the former comprising independent character members and setting devices adapted for actuation by the trips, means for actuating the character members and for revolving the character member frame and selecting mechanism, an escapement for controlling travel of the selecting mechanism, and key members for setting said trips and actuating the escapement.

44. In a telegraph transmitter, a character member frame and selecting mechanism concentrically mounted one within the other, character members independently mounted in said frame and having individual trips, setting devices with the selecting mechanism adapted for actuating said trips, means for actuating the character members and for revolving the character member frame and selecting mechanism, an escapement for controlling travel of the selecting mechanism, key levers for actuating the setting devices and the escapement and a back spacer adapted for moving said selecting mechanism against the tension of the driving member.

45. In a telegraph transmitter, a character member frame, a plurality of independently operable character members in said frame, bearing members pivotally mounted in said frame and yieldingly tensioned in one direction, a driving member revolubly mounted in said bearing members and adapted for operative engagement with any of said character members, and a selective mechanism for moving any of the character members into engagement with said yieldable driving member.

46. In a telegraph transmitter, a plurality of independently operable character members, a yieldable driver adapted for actuating any of said character members, a common circuit closer, and a revoluble selecting mechanism adapted for moving any of the character members into operative engagement with the yieldable member and circuit closer.

47. In a telegraph transmitter, a revoluble frame, a plurality of carrying members movably mounted on said frame, eccentric to the frame mounting, a character member revolubly mounted on each of said carrying members, a common driver for all of said character members, a selecting mechanism for actuating said carrying members to shift the positions of the character members, and a circuit closer adapted for actuation by any of the character members.

48. In a telegraph transmitter, a revoluble frame, a plurality of carrying members movably mounted on said frame, eccentric to the frame mounting, a character member revolubly mounted on each of said carrying members, a common driver for all of said character members, a selecting mechanism for actuating said carrying members to shift the positions of the character members, a circuit closer adapted for actuation by any of the character members, and a latch for holding the carrying member in active position for a complete phase of its character member.

49. In a telegraph transmittter, a revoluble frame, a plurality of character members revolubly mounted in the frame, a pinion swingingly mounted in said frame and adapted for engagement by the character members, selecting mechanism for determining the engagement of the character members with the pinion, comprising lever arms and an independently movable member having trips adapted for engaging said arms, key members for actuating said trips, and driving mechanism for actuating said pinion, the carrying frame and the trip carrying member.

50. In a telegraph transmitter, the combination with a frame, of a driving pinion, a bank of levers eccentrically mounted on the frame, a character member carried by one arm of each lever, a selecting mechanism adapted for rocking said levers to move the character members into driving relation with the pinion, a circuit lever adapted for actuation by any of the character members, and a latch for each lever adapted for holding same in set position for each phase of the character member carried thereby.

51. In a telegraph transmitter, a suitable frame, a driving pinion, a brush mounted on the frame, a lever pivotally mounted on the frame and having a character member revolubly mounted in one of its arms and comprising a gear wheel adapted for meshing with the driving pinion and character teeth adapted for contact with said brush, a selecting mechanism adapted for rocking said lever to move the character member into operative relation with the pinion and brush, a latch adapted for automatic movement into holding position with the lever following the rocking of the lever by the selecting mechanism, and means on the character member and latch whereby the latch is rocked to release the lever after each phase of the character member.

52. In a telegraph transmitter, the combination with a driving pinion and brush; of a pivotally mounted lever; a character member revolubly mounted in one arm of said lever and comprising a gear wheel adapted for meshing with said pinion, character teeth adapted for engaging said brush, and latch teeth; selecting mechanism for rocking the lever; a latch having an arm adapted for holding the lever in operative position and an arm for engaging the latch teeth on said character member to set the character member when the latter is inert and whereby the latch is rocked after each phase of the character member.

53. In a telegraph transmitter, the combination with a brush and a driving mechanism, of a carrying device, a character member freely mounted on the carrying device and adapted for actuation from the driving mechanism, said character member comprising character teeth adapted for contacting the brush and having latch teeth, a selecting mechanism adapted for actuating the carrying device, and a latch adapted for coöperation with the latch teeth on the character member to set the character member with the character teeth thereof in determined relation to the brush.

54. In a telegraph transmitter, the combination with a brush and a driving mechanism, of a carrying device, a character member freely mounted on the carrying device and adapted for actuation from the driving member, said character member comprising character teeth adapted for contacting the brush and having latch teeth, a selecting mechanism adapted for actuating the carrying device, and a latch adapted for holding the carrying device in operative position and for automatically setting the character member in determined relation to the brush at each actuation of the carrying device.

55. In a telegraph transmitter, the combination with a brush and driving member, of a carrying device, a character member revolubly mounted on said carrying device and adapted for operative engagement with the driving member and brush, said character member comprising character teeth and latch teeth, the latter having inclined faces, and a latch adapted for holding the character member in a determined set position and for engagement with the inclined face to automatically move the character member to such determined set position after each operative engagement with the brush.

56. In a telegraph transmitter, the combination with a driving member and brush, of a movable carrying device, a character member revolubly mounted on said carrying device and adapted for operative engagement with the driving member and brush, latch members on the character member arranged in different paths, a latch for each of the carrying devices comprising an arm adapted for holding the carrying devices in active position, and a second arm adapted for engagement by a latch member on a character member to hold the latter in set position or by another latch member on the character member to rock said latch and selecting mechanism for actuating the carrying device.

57. In a telegraph transmitter, the combination with a brush and driving pinion, of a movable carrying device, a character member revolubly mounted on said carrying device and comprising a gear wheel adapted for engaging the driving pinion, a ring on one face of the gear wheel having character teeth on its periphery adapted for contacting the brush, and having latch points on its inner periphery, a plate on said gear wheel within said ring having a notched periphery, a latch member having an arm adapted for holding the carrying device in active position, an arm adapted for engaging the ring points and the notched plate of the character member, and a spring arm having a spring connected therewith and with the carrying device.

58. In a telegraph transmitter, the combination with a driving member and brush, of a lever having a character member revolubly mounted in one of its arms and adapted for engaging the driving member and brush, a selecting mechanism adapted for engaging a second arm on said lever to rock the character members into active position, and a lock for holding said second lever arm and selecting mechanism together during an operative phase of the character member.

59. The combination with a frame, of a driving member and brush carried by the frame, a lever pivotally mounted on the frame, and having a character member revolubly mounted in one of its arms, a selecting mechanism comprising means adapted for engaging a second arm of said lever, a carriage adapted for actuation by said second lever arm when the latter is rocked by the selecting mechanism, a second carriage adapted for actuation by said first named carriage and for engaging the means by which said lever arm was rocked, and means for actuating said selecting mechanism.

60. In a telegraph transmitter, the combination with a frame, of a driving member and brush carried by the frame, a lever having a character member revolubly mounted in one of its arms and adapted for engagement with the driving member and brush, a carriage pivotally mounted in the frame and having a member overlying the second arm of the lever, a second, pivotally mounted carriage adapted for actuation by the first named carriage, and selecting mechanism comprising means adapted for operative engagement with the second arm of the character member lever and for locking engagement by said second carriage when said lever is rocked.

61. In a telegraph transmitter, the combination with a brush and driving member, of a carrying device, a character member on the carrying device adapted for operative engagement with the brush and driving member, a revoluble drum inclosing the carrying device, a plurality of setting members pivotally mounted in the drum and having portions projecting into and from the drum, and key members adapted for actuating said setting members.

62. In a telegraph transmitter, the combination with character members, of a revoluble drum inclosing and adapted for actuating said character members, means for yieldingly revolving said drum, means for controlling the actuation of the drum, and a back spacer adapted for actuating the drum against the tension of its revolving means for preventing the actuation of said character members.

63. In a telegraph transmitter, character mechanism, a revoluble drum, setting devices carried by the drum and adapted for actuating the character mechanism, means for yieldingly revolving the drum, for controlling the yielding travel of said drum, and a back spacer adapted for actuating said drum against the tension of its driving mechanism.

64. In a telegraph transmitter, character mechanism comprising means for controlling the actuation of individual character members, a revoluble drum inclosing the character mechanism, setting devices pivotally mounted in the drum and each having an inwardly projecting arm adapted for engaging the controlling means for the character mechanism and having an outwardly projecting arm, and key levers adapted for engaging said outwardly projecting arms to set said controlling means.

65. In a telegraph transmitter, character mechanism comprising means for controlling the actuation of individual character members, a revoluble drum inclosing the character mechanism, setting devices pivotally mounted in the drum and each having an inwardly projecting arm adapted for engaging the controlling means in the character mechanism and having an outwardly projecting arm, key levers adapted for engaging said outwardly projecting arms to set the controlling means, and means for returning said setting devices to initial position 66. In a telegraph transmitter, a character mechanism comprising means adapted for setting individual character members, a revoluble drum inclosing the character mechanism, setting devices pivotally mounted in said drum and each comprising an inwardly projecting arm adapted for engaging a controlling means in the character mechanism and comprising a plurality of outwardly projecting arms, key levers adapted for engaging relative outwardly projecting arms of said setting devices to rock the devices to operative position, and common means adapted for engaging the other outer arms of said setting devices to return the latter to initial position.

67. In a telegraph transmitter, a character mechanism comprising means adapted for setting individual character members, a revoluble drum inclosing the character mechanism, setting devices pivotally mounted in said drum and each comprising an inwardly projecting arm adapted for engaging a controlling means in the character mechanism and comprising a plurality of outwardly projecting arms, key levers adapted for engaging relative outwardly projecting arms of said setting devices to rock the devices to operative position, and common means for engaging the other outer arms of said setting devices to return the latter to initial position irrespective of the direction of travel of the drum.

68. In a telegraph transmitter, a character mechanism comprising means adapted for setting individual character members, a revoluble drum inclosing the character mechanism, setting devices pivotally mounted in said drum and each comprising an inwardly projecting arm adapted for engaging a controlling means in the character mechanism and comprising a plurality of outwardly projecting arms, key levers adapted for engagement, relative outwardly projecting arms of said setting divices to rock the devices to operative position, common means for engaging the other outer arms of said setting devices to return the latter to initial position, and a spring for yieldingly holding each of the setting devices in initial or set position.

69. In a telegraph transmitter, a character mechanism, each comprising an individual carrying device and a character member on each device, a revoluble drum inclosing the character mechanism and provided with a plurality of series of apertures, a setting device pivotally mounted in each aperture and comprising inwardly and outwardly projecting arms, a spring in each aperture adapted for holding the setting device in initial or set position, a key lever for each series adapted for engagement with an outwardly projected arm to rock the setting devices to set position, and common means for engagement therewith to return the latter to initial position.

70. In a telegraph transmitter, character mechanism comprising a driver and brush, a plurality of individually operative character members adapted for contact with the driver and brush, a revoluble drum, a gearing mounted concentrically with the drum and having transmission with the driver for actuating the character members, a prime mover, a gear wheel eccentrically mounted on the drum and connected with the concentric gear wheel and with the prime mover whereby the character member driver is actuated and radial tension exerted on the drum, and selecting mechanism for controlling the actuation of individual character members.

71. In a telegraph transmitter, a character member frame and drum revolubly mounted on a common axis, a driving member carried by the frame, gears eccentrically mounted on the drum, a gear wheel mounted concentrically with the frame and drum and having operative connection with the drum member through the eccentrically mounted gears, an intermediate gear on said drum, a prime mover, a second gear wheel mounted concentrically with the frame and drum and operatively connected with the prime mover and with one of the eccentrically mounted gear wheels through said intermediate gear, whereby the character member driver is actuated and the frame and drum tensioned in opposite directions.

72. In a telegraph transmitter, a frame, a drum revolubly mounted on a common axis, hangers pivotally mounted in said frame, a member revolubly supported by said hangers, means for yieldingly tensioning said driving member toward operative position, character members adapted for operative engagement with said driving member, a gear wheel mounted concentrically with the frame and drum, operative connection between the said gear wheel and the driving member, a governor carried by said frame, a pin slidably mounted in the frame axis and extending to the exterior of the drum, and means operable by said pin for controlling said governor.

73. In a telegraph transmitter, a revoluble frame, carrying devices pivotally mounted in said frame, character members carried by said devices, a brush adapted for contact with the character members, means for driving the character members, selecting mechanism adapted for actuating the carrying devices, an indicator and flexible means connected with the indicator, and adapted for winding oppositely with the frame.

74. In a telegraph transmitter, character members and selecting mechanism adapted for sending a message, levers adapted for actuation by said selective mechanism for actuating said character members and means for laterally shifting said levers whereby a message may be repeated without resetting the selecting mechanism.

75. In a telegraph transmitter, character members, trip members for actuating the character members, a selecting mechanism, means for actuating the selecting mechanism to rock the character members, means for reversing the selecting mechanism to repeat a message, and means for shifting the trip members out of the path of the selecting mechanism.

76. In a telegraph transmitter, a selecting mechanism having suitable setting devices, a plurality of carrying members having portions adapted for projection into the path of active setting devices, character members mounted on the carrying devices, a brush and driver adapted for engagement by the character members, and means for shifting said carrying devices to move same out of the path of active setting devices in the selecting mechanism.

77. In a telegraph transmitter, a character member frame and selecting mechanism revolubly mounted on a common axis independent of each other, character members revolubly mounted in said frame, common driving mechanism for revolving the selecting mechanism and frame and actuating the character members, and means for disconnecting the frame from said driving mechanism and actuating same independently of the other parts.

78. In a telegraph transmitter, a supporting frame, a sleeve slidably mounted in said frame, a shaft mounted in said sleeve, a character member frame fixed on said shaft, character mechanism mounted in said frame, a gear wheel revolubly mounted on said sleeve and adapted for sliding travel therewith, transmission between said gear wheel and the character mechanism, a prime mover adapted for driving said gear wheel, a second gear wheel fixed on said sleeve, and a slidable handle shaft having a gear wheel and having flange members extending over said gear wheel whereby the sleeve may be moved longitudinally on the character frame shaft to break the transmission and whereby said sleeve may be revolved.

79. In a telegraph transmitter, an inclosing case, a frame located within said case, bearings in said frame, a sleeve revolubly mounted in one of said bearings, shaft members revoluble in said sleeve and in the other bearing, a character member frame fixed on said shafts, character members in said frame, a selecting mechanism having spiders revolubly mounted on said sleeve and one of said shafts respectively, one of said spiders having a clutch face, a collar one of said frame bearings and partially inclosing said sleeve, a gear wheel revolubly mounted on said collar, a shaft revolubly mounted in one of said spiders, gear wheels on said last named shaft meshing with the gear wheels on the sleeve and collar respectively, transmission from the character mechanism comprising a gear wheel on said sleeve having a clutch face adapted for coöperation with the clutch face on said spider, a gear wheel fixed on said sleeve, a shaft revolubly mounted in the inclosing case, a gear wheel fixed on said shaft and meshing with the gear wheel fixed on the said sleeve, and having flanges partially inclosing said last named gear wheel, and a handle on said shaft exterior to the case whereby said sleeve may be moved longitudinally to engage the clutches on the inner gear wheel and spider, and move said inner gear wheel out of mesh with the transmission gear.

80. In a telegraph transmitter, a character member frame and selecting mechanism adapted for independent revoluble movement, character members in said frame, each having a trip member, setting devices in the selecting mechanism adapted for engaging said trip members, means for actuating the selecting mechanism, the character member frame and character members including gear wheels in the transmission to the character member frame and character members, and means for simultaneously shifting one of said gear wheels to break said transmission and shift said trip members out of the path of the setting devices.

81. In a telegraph transmitter, a character member frame, character members mounted in the frame and each comprising a trip, transmission mechanism connected with the character members and comprising a gear wheel, a selecting mechanism, means for actuating the selecting mechanism comprising a gear wheel, a gear wheel common to both the selecting mechanism and character member gears, means for sliding said common gear wheel out of mesh with the character member gear, a slide adapted for contacting the character member trips, and means adapted for simultaneously moving said common gear wheel out of mesh with the character member gear and actuating said slide to shift said trips out of operative relation to the selecting mechanism.

82. In a telegraph transmitter, a character member frame, character members mounted in the frame and each comprising a trip, transmission mechanism connected with the character members and comprising a gear wheel, a selecting mechanism, means for actuating the selecting mechanism comprising a gear wheel, a gear wheel common to both the selecting mechanism and character member gears, means for sliding said common gear wheel out of mesh with the character member gear, a slide adapted for contacting the character member trips, means adapted for simultaneously moving said common gear wheel out of mesh with the character member gear and actuating said slide to shift said trips out of operative relation to the selecting mechanism, and clutch members on the selecting mechanism and common gear wheel adapted to mesh when said common gear wheel is shifted to release the character members.

83. In a telegraph transmitter, a circuit closer, means for actuating said circuit closer at various fixed speeds to form a telegraphic character, a selective mechanism for tripping said actuating means into active position, and means on said actuating means for determining the active period thereof.

84. In a telegraph transmitter, a circuit closer, means for actuating said circuit closer at various mechanically regulated speeds to form a telegraphic character, a selective mechanism for tripping said actuating means into active position, and means on said actuating means for determining the active period thereof.

85. In a telegraph transmitter, a circuit closer, character members for actuating said circuit closer, a selecting mechanism having a plurality of setting devices for tripping said character members into functional position, and means on said character members for determining the active period thereof.

86. In a telegraph transmitter, a circuit closer, character members for actuating said circuit closer, a selecting mechanism, a plurality of setting devices in said selecting mechanism, and means for actuating said setting devices, whereby one or more setting devices may be successively accumulated in proper sequence to actuate said character members.

87. In a telegraph transmitter, a circuit closer, character members for actuating said circuit closer, a selecting mechanism, a plurality of setting devices in said selecting mechanism, and a key-board for setting said setting devices whereby one or more setting device may be accumulated in proper sequence to actuate said character members.

88. In a telegraph transmitter, character members, a means for setting the character members, and mechanism for actuating the setting means to render same operative prior to action thereof on the character members.

89. In a telegraph transmitter, a selecting mechanism comprising setting devices, a character member frame comprising individual character members, each having a member adapted for actuation by said setting devices, a slide adapted for engaging said members, and means for actuating said slide to move said member out of the path of said setting devices.

90. In a telegraph transmitter, a revoluble selecting mechanism comprising setting devices and having a clutch face, a character member frame, character members in said frame each having a trip member, transmission for actuating said character members comprising a gear wheel, a slidable gear wheel having a clutch face adapted for meshing with the face on said selecting mechanism, a slide having members adapted for engagement with said trips, means for yieldingly retaining said slide in inoperative position, a lever pivotally connected with said sliding gear and adapted for actuating said slide, and means for sliding said gear.

91. In a telegraph transmitter, a revoluble character member frame, character members in said frame, a driver exterior to the frame, transmission between the driver and character members, a governor within said frame for controlling speed of said transmission, and means for setting said governor for predetermined speeds.

92. In a telegraph transmitter, an inclosing case, a character member frame revolubly mounted within the case, character members carried by said frame, selecting mechanism for said character members, a driver transmission between the character members and driver, a governor for controlling speed of said transmission, means extending exterior to the case for controlling said governor, and means in said frame for setting said governor for a predetermined speed.

93. In a telegraph transmitter, an inclosing case, a character member frame revolubly mounted within the case, character members in said frame, a driver, transmission between the driver and character members, a governor for controlling speed of said transmission, and means for controlling said governor comprising a lever and a rod extending through the axis of said frame.

94. In a telegraph transmitter, an inclosing case, a character member frame revolubly mounted within the case, character members in said frame, a driver, transmission between the driver and character members, a governor for controlling speed of said transmission, means for controlling said governor comprising a lever, a rod extending through the axis of said frame, a handle member on said case for actuating the rod, and a stop for said handle member.

95. In a telegraph transmitter, an inclosing case, a character member frame revolubly mounted within the case, character members in said frame, a driver, transmission between the driver and character members, a governor for controlling speed of said transmission, means for controlling said governor comprising a lever, a rod extending through the axis of said frame, a handle member on said case for actuating said rod, an indicator, and a stop adjustably connected with said indicator and adapted for limiting travel of said handle member.

96. In a telegraph transmitter, an inclosing case, a character member frame revolubly mounted within the case, character members in said frame, a driver, transmission between the driver and character members, a governor for controlling speed of said transmission, means for controlling said governor comprising a lever, a rod extending through the axis of said frame, a handle member having a cam adapted for actuating said rod, an indicator having a notched flange, a stop having a tooth adapted for contact with the notched flange, and a pointer connected with said handle and adapted for engaging said stop.

97. In a telegraph transmitter, the combination with a brush and driver, of a plurality of character members each having a trip member, a selecting mechanism comprising setting devices adapted for rocking said trip members, key levers adapted for actuating said setting devices, means for constantly tensioning the selecting mechanism, and an escapement operable by any of said key levers for releasing said selecting mechanism by steps.

98. In a telegraph transmitter, a character member frame, character member contained within the frame, selecting mechanism adapted for setting the character members, key levers for actuating the selecting mechanism, bars adapted for actuation by said key levers a track connected with said bars, a tram adapted for travel on said track, means connecting opposite ends of the tram with said character member frame, and a pointer connected with said tram.

99. In a telegraph transmitter, a character member frame, character members contained within the frame, selecting mechanism adapted for setting the character members, key levers for actuating the selecting mechanism, bars adapted for actuation by said key levers a track connected with said bars, a tram adapted for travel on said track, means connecting opposite ends of the tram with said character member frame, a pointer connected with said tram, said track having a raised portion adapted for engagement by the tram to lower said bars out of operative relation to the key levers.

100. In a telegraph transmitter, a character member frame, character members contained within the frame, selecting mechanism adapted for setting the character members, key levers for actuating the selecting mechanism, bars adapted for actuation by said key levers a track connected with said bars, a tram adapted for travel on said track, means connecting opposite ends of the tram with said character member frame, a pointer connected with said tram, a member on said track, and a pivotally mounted member adapted for engagement by the tram and for movement into coöperative relation with the track member to hold said key levers in inoperative position.

101. In a telegraph transmitter, a stationary support, a circuit terminal grounded on said support, a character mechanism revolubly mounted in said support and comprising individually operative character members, and a brush, a movable contact bracket carried by said mechanism and insulated from but adapted for actuation by the brush, a contact member carried by but insulated from the revoluble character mechanism, a brush having insulated mounting on the stationary frame and contacting said contact member, and a circuit terminal insulated from the case and connected with said last named brush.

102. In a telegraph transmitter, the combination with a suitable support, of an independently revoluble character member frame and selecting mechanism, of independently operable character members mounted in said frame, a brush adapted for actuation by the character members, a contact bracket carried by and insulated from said frame, a contact member carried by and insulated from the selecting mechanism, a brush carried by said bracket and wiping the contact member in the selecting mechanism, a brush carried by and insulated from the support and wiping the contact member in the selecting mechanism, a terminal having grounded connection through the case with the character members, and a terminal insulated from the case and connected with said last named brush.

103. In a telegraph transmitter, a character member frame, character members contained within the frame, selecting mechanism adapted for setting the character members, key levers for actuating the selecting mechanism, bars adapted for actuation by said key levers, a track connected with said bars, a tram adapted for travel on said track, means connecting opposite ends of said tram with said character frame for moving said tram, a roller on said tram, a bell, a clapper for said bell, and a lever arm connected with said clapper and adapted for actuation by said roller.

104. In a telegraph transmitter, a stationary frame, a character member frame revolubly mounted in said frame, a plurality of character members contained within the frame, a selecting mechanism adapted for setting the character members, key levers for actuating the selecting mechanism, a bar yieldingly held against the base of said key levers, and having rearwardly extending ends pivotally mounted on said frame and adapted for actuation by said key levers, a track on said bar and extending above and spaced from said key levers, a track on said stationary frame in line with said movable track, a tram having grooved rollers adapted for travel on both of said tracks, means connecting opposite ends of said tram with said character member frame for moving said tram along its tracks, a trip roller on said tram, a bell on said stationary frame, a rod pivotally mounted on said stationary frame, a clapper on said rod for ringing said bell, and levers projecting from said rod in the path of said trip roller whereby said bell is sounded at the maximum and minimum limits of said tram.

105. In a telegraph transmitter, a stationary frame, a character member frame revolubly mounted in said frame, a plurality of character members contained within said frame, a selecting mechanism revolubly mounted on and inclosing said character member frame and adapted for setting the character members, key levers for actuating the selecting mechanism, a bar yieldingly held against the base of said key levers, and having rearwardly extending ends pivotally mounted on said frame and adapted for actuation by said key levers, a track on said bar and extending above and spaced from said key levers, a track on said stationary frame in line with said movable track, a train having grooved rollers adapted for travel on both of said tracks, a drum on each end of said character member frame, a cable secured to each end of said tram and oppositely wound on said drums to move the tram along its tracks, a trip roller on said tram, a bell on said stationary frame, a rod pivotally mounted on said stationary frame, a clapper on said rod for ringing said bell, and levers projecting from said rod in the path of said trip roller, whereby said bell is sounded at the maximum and minimum limits of said tram.

106. In a telegraph transmitter, a character member frame, character members contained within said frame, a selecting mechanism for setting the character members, and key levers for actuating the selecting mechanism in advance of the actuation of said character members.

107. In a telegraph transmitter, a character member frame, character members contained within said frame, a selecting mechanism for actuating said character members revolubly mounted on and adapted to inclose said character member frame and tensioned in opposite directions, key levers for actuating said selecting mechanism in one direction at an arbitrary speed, a governor for permitting opposite rotation of said character member frame at a fixed speed, and a visible indicator for recording the relative position of said character member frame and said selecting mechanism.

108. In a telegraph transmitter, a character member frame, character members contained within said frame, a selecting mechanism for setting the character members, key levers for actuating the selecting mechanism in advance of the actuation of the character member frame, and an audible indicator for recording the maximum and minimum advance movements of said selecting mechanism.

109. In a telegraph transmitter, a character member frame, character members contained within said frame, a selecting mechanism for setting the character members, a bank of yieldingly tensioned key levers for actuating said selecting mechanism, and means for automatically supplementing the tension on said key levers.

110. In a telegraph transmitter, a character member frame, character members contained within said frame, a selecting mechanism for setting the character members, a governor for regulating the speed of said character member frame, a bank of yieldable key levers for actuating said selecting mechanism at an arbitrary speed and in advance of said character member frame, and means for supplementing the tension on the key levers when the selecting mechanism has reached a certain point in advance of the character member frame.

111. In a telegraph transmitter, a revoluble frame, a plurality of carrying members movably mounted on said frame eccentric to the frame mounting, a character member revolubly mounted in each of said carrying members, a circuit closer adapted for actuation by any of said character members, a common driver for all of said character members, a selecting mechanism for actuating said carrying members, a latch for holding the carrying member in active position for a complete phase of its character member, and means on said character member for tripping said latch.

112. In a telegraph transmitter, a revolubly frame, a plurality of angular carrying members pivotally mounted in said frame eccentric to the frame mounting and having guided relation with the frame, character members revolubly mounted on each of said carrying members, a common driver for all of said character members, a selecting mechanism for actuating said carrying members to shift the positions of the character members, a circuit closer adapted for actuation by any of the character members, a latch for holding the carrying member in active position, an internal cam on said character member for tripping said latch at the completion of one phase of its character member, and an external cam having peripheral notches for receiving said latch to maintain said character member in position.

113. In a telegraph transmitter, a revolubly frame, a plurality of angular carrying members pivotally mounted in said frame eccentric to the frame mounting and having guided relation with the frame, character members revolubly mounted on each of said carrying members, a common driver for all of said character members, a selecting mechanism for actuating said carrying members to shift said character members into mesh with the common driver, a circuit closer adapted for actuation by any of the character members, a latch for holding the carrying member in active position, an internal cam on said character member for tripping the latch at the end of one phase of its character member, a spring for tensioning said latch toward said cam, toward locking position with the carrying member, and for tensioning the carrying member toward inoperative position, and an external cam having peripheral notches for receiving said latch after said latch has been tripped by said internal cam.

114. In a telegraph transmitter, a revolubly frame, a plurality of angular carrying members pivotally mounted in said frame eccentric to the frame mounting, character members revolubly mounted on each of said carrying members, a common driver for all of and normally disengaged from said character members, a circuit breaker having fingers adapted for action by and normally spaced from said character members, a selecting mechanism for actuating said carrying members to shift said carrying members into mesh with the common driver and with the circuit breaker, a latch for holding the carrying member in active position, and means on the character member for tripping the latch at the completion of one phase of the character member.

115. In a telegraph transmitter, a character mechanism comprising means adapted for setting individual character members, a revoluble drum inclosing the character mechanism, setting devices pivotally mounted in said drum, and each comprising an inwardly projecting arm adapted for engaging a setting means in the character mechanism, an outwardly projecting arm having a laterally turned end adapted to engage the drum to limit the travel thereof in one direction, and a second outwardly projecting arm adapted to engage said drum to limit the travel of the device in the opposite direction, a spring for yieldingly holding said device at either limit of its travel, key levers adapted for engaging the laterally turned ends of said first named outwardly projecting arms to rock the devices to operative position, and common means adapted for engaging the second outwardly projecting arms to return the devices to initial position.

In testimony whereof I affix my signature in presence of two witnesses.

EDWIN H. PIERSEN.

Witnesses:
LEWIS L. MILLER,
LETA E. COATS.